US010904349B2

(12) United States Patent
McPhee et al.

(10) Patent No.: US 10,904,349 B2
(45) Date of Patent: Jan. 26, 2021

(54) REAL-TIME GENERATION AND PROVISIONING OF CONTEXTUAL NOTIFICATION DATA TO NETWORK-CONNECTED DEVICES

(71) Applicant: The Toronto-Dominion Bank, Toronto (CA)

(72) Inventors: Adam Douglas McPhee, Waterloo (CA); Matta Wakim, Petersburg (CA); Kyryll Odobetskiy, Waterloo (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 267 days.

(21) Appl. No.: 15/725,598

(22) Filed: Oct. 5, 2017

(65) Prior Publication Data

US 2019/0109915 A1  Apr. 11, 2019

(51) Int. Cl.
| | | |
|---|---|---|
| G06F 15/16 | (2006.01) | |
| H04L 29/08 | (2006.01) | |
| G06Q 20/20 | (2012.01) | |
| G06Q 20/40 | (2012.01) | |
| H04L 12/58 | (2006.01) | |
| H04L 12/24 | (2006.01) | |

(52) U.S. Cl.
CPC ............ *H04L 67/26* (2013.01); *G06Q 20/20* (2013.01); *G06Q 20/40* (2013.01); *H04L 51/24* (2013.01); *H04L 67/306* (2013.01); *H04L 41/06* (2013.01); *H04L 51/02* (2013.01); *H04L 51/26* (2013.01)

(58) Field of Classification Search
CPC combination set(s) only.
See application file for complete search history.

(56) References Cited

U.S. PATENT DOCUMENTS

| 7,831,520 | B2 | 11/2010 | Mengerink | |
|---|---|---|---|---|
| 9,760,871 | B1 * | 9/2017 | Pourfallah | ............ G06Q 50/22 |
| 10,121,141 | B1 * | 11/2018 | Belleville | .......... G06Q 20/3672 |
| 10,366,378 | B1 * | 7/2019 | Han | ................... G06Q 20/4014 |

(Continued)

OTHER PUBLICATIONS

Broadridge Financial Solutions, Inc., "Broadridge Expands its Global Post-Trade Control Solutions Through Acquisition of Message Automation," May 9, 2017 (5 pages).

*Primary Examiner* — Sm A Rahman
(74) *Attorney, Agent, or Firm* — Duane Morris LLP

(57) ABSTRACT

The disclosed embodiments include computer-implemented systems, apparatuses, and processes that dynamically generate and provision contextually relevant notifications to network-connected devices. For example, an apparatus receives a first signal that includes information indicative of an authorized data exchange involving a terminal device and a client device. The apparatus identifies and loads data specifying a notification template from the storage unit, and generates notification data that is populated with a portion of the received information in accordance with the notification template. The apparatus further transmits a second signal that includes the notification data to the client device. In some instances, the second signal is transmitted through a programmatic interface associated with an application program executed by the client device, and the client device is configured to display the notification data on a corresponding interface.

19 Claims, 12 Drawing Sheets

(56) References Cited

U.S. PATENT DOCUMENTS

| | | | |
|---|---|---|---|
| 2007/0220092 A1 | 9/2007 | Heitzeberg et al. | |
| 2010/0191578 A1 | 7/2010 | Tran et al. | |
| 2011/0258065 A1* | 10/2011 | Fordyce, III | G06Q 10/10 705/26.1 |
| 2012/0130835 A1 | 5/2012 | Fan et al. | |
| 2012/0136780 A1* | 5/2012 | El-Awady | G06Q 20/102 705/40 |
| 2013/0268437 A1* | 10/2013 | Desai | G06Q 20/08 705/41 |
| 2014/0052617 A1* | 2/2014 | Chawla | G06Q 20/12 705/39 |
| 2014/0100973 A1* | 4/2014 | Brown | G06Q 20/34 705/17 |
| 2014/0180793 A1* | 6/2014 | Boal | G06Q 30/0255 705/14.43 |
| 2014/0214670 A1* | 7/2014 | McKenna | G06Q 20/40145 705/44 |
| 2015/0095225 A1* | 4/2015 | Appana | G06Q 20/3674 705/41 |
| 2015/0371212 A1* | 12/2015 | Giordano | G06Q 20/3224 705/44 |
| 2016/0012428 A1* | 1/2016 | Haldenby | G06Q 20/3572 705/39 |
| 2016/0012465 A1* | 1/2016 | Sharp | G06Q 20/384 705/14.17 |
| 2016/0019536 A1* | 1/2016 | Ortiz | G06Q 20/3221 705/67 |
| 2016/0057619 A1* | 2/2016 | Lopez | G06Q 20/382 380/247 |
| 2016/0086252 A1 | 3/2016 | Avgiris et al. | |
| 2016/0117763 A1 | 4/2016 | Cypher et al. | |
| 2017/0111513 A1 | 4/2017 | Ye | |
| 2018/0150823 A1* | 5/2018 | Omojola | G06Q 20/10 |
| 2018/0293573 A1* | 10/2018 | Ortiz | G06Q 20/023 |
| 2019/0114605 A1* | 4/2019 | Valencia | G06Q 20/20 |

* cited by examiner

US 10,904,349 B2

REAL-TIME GENERATION AND PROVISIONING OF CONTEXTUAL NOTIFICATION DATA TO NETWORK-CONNECTED DEVICES

TECHNICAL FIELD

The disclosed embodiments generally relate to computer-implemented systems and processes that automatically generate and provision contextually relevant notifications to network-connected devices.

BACKGROUND

Today, payment systems and related technologies continuously evolve in response to advances in payment instruments, such as the ongoing transition from physical transaction cards to digital payment instruments maintained on mobile devices. These innovations result in additional mechanisms for submitting payment to an electronic or physical merchant and for flexibly funding transactions initiated by the electronic or physical merchant. These innovations also extend beyond the capabilities of many transaction-based messaging services, which provide delayed transactional notifications through out-of-band communications.

SUMMARY

In some embodiments, an apparatus includes a communications unit, a storage unit storing instructions, and at least one processor coupled to the communications unit and the storage unit. The at least one processor is configured to execute the instructions to receive a first signal via the communications unit. The first signal includes information indicative of an authorized data exchange involving a terminal device and a client device, and the information includes a value of a parameter that characterizes the authorized data exchange. The at least one processor is further configured to execute the instructions to identify and load data specifying a notification template from the storage unit, and generate notification data in accordance with the notification template. The notification data is populated with a portion of the received information. The at least one processor is also configured to execute the instructions to transmit a second signal via the communications unit to the client device. The second signal includes the notification data, and the second signal is transmitted through a programmatic interface associated with an application program executed by the client device. The client device is configured to display the notification data on a corresponding interface.

In further embodiments, a computer-implemented method includes receiving, by at least one processor, a first signal comprising information indicative of an authorized data exchange involving a terminal device and a client device. The information includes a value of a parameter that characterizes the authorized data exchange. The computer-implemented method further includes identifying and loading, by the at least one processor, data specifying a notification template from a storage unit, and generating, by the at least one processor, notification data in accordance with the notification template. The notification data is populated with a portion of the received information. The computer-implemented method also includes transmitting, by the at least one processor, a second signal to the client device. The second signal includes the notification data, and the second signal is transmitted through a programmatic interface associated with an application program executed by the client device. The client device is configured to display the notification data on a corresponding interface.

Additionally, in some embodiments, a tangible, non-transitory computer-readable medium stores instructions that, when executed by at least one processor, perform a method that includes receiving a first signal comprising information indicative of an authorized data exchange involving a terminal device and a client device. The information includes a value of a parameter that characterizes the authorized data exchange. The method further includes identifying and loading data specifying a notification template from a storage unit, and generating notification data in accordance with the notification template. The notification data is populated with a portion of the received information. The method also includes transmitting a second signal to the client device. The second signal includes the notification data, and the second signal is transmitted through a programmatic interface associated with an application program executed by the client device. The client device is configured to display the notification data on a corresponding interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
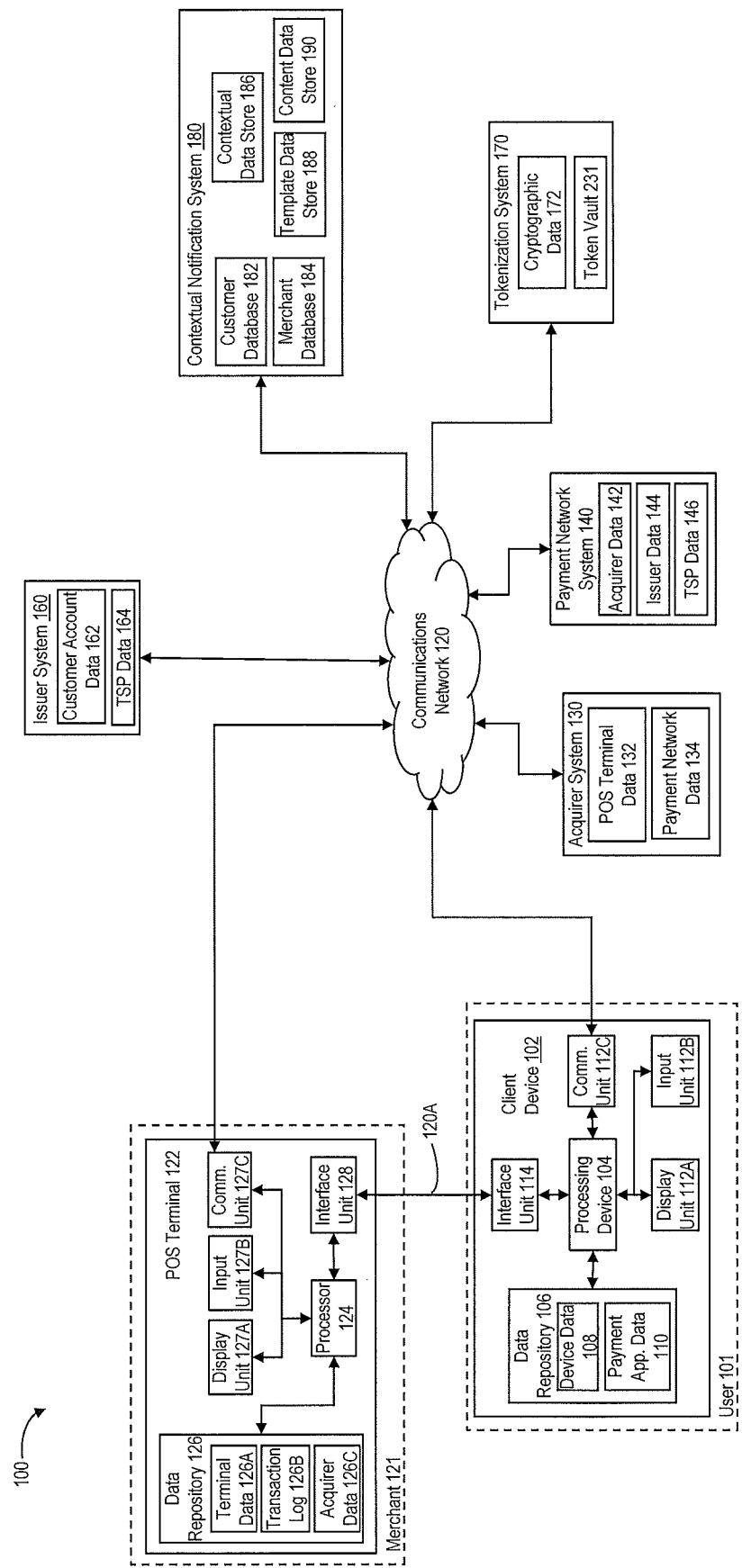
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented apparatuses, devices, and processes that, among other things, perform operations that initiate, approve, and execute exchanges of data between network-connected devices operating in a computing environment. Further, and as described below, these exemplary apparatus, devices, and process can also perform operations that generate and distribute, directly to the network-connected devices through corresponding programmatic interfaces, notifications of contextual and temporal relevance to the executed data exchanges.

In certain aspects, as described below, a client device operating within the computing environment may establish communications with a terminal device across a direct channel of communication. The client device may locally store an application program within one or more tangible, non-transitory memories, and the application program, when executed by the client device, may cause the client device to initiate an exchange of data with the terminal device across the direct communications channel. By way of example, the initiated data exchange may be characterized by a value of one or more data exchange parameters, and the client device may transmit, across the direct communications channel to the terminal device, information that characterizes a data type available for use in the initiated data exchange and information that identifies the client device or the executed application program. The available data type may, in some instances, be provisioned to the client device for use in exchanges of data initiated by the executed application.

The terminal device may receive the information transmitted by the client device and in some aspects, may perform operations that package the received information, along with additional or alternate information characterizing the initiated data exchange (e.g., the value of the one or more data-exchange parameters or information identifying the terminal device), into an authorization request. In some instances, described herein, the terminal device may perform operations that selectively encrypt portions of the packaged information to generate a cryptographically secure representation of the authorization request. In additional instances, the terminal device (or alternatively, the client device) may also selectively tokenize sensitive portions of the packaged information and generate a tokenized authorization request that is less sensitive to exploitation by malicious third parties.

In some aspects, as described herein, the terminal device may transmit the cryptographically secure and/or tokenized authorization request a computing system associated with the client device, e.g., directly across an appropriate communications network or indirectly through one or more intermediate devices or communications systems across the communications network. For example, the computing system may be associated with available data type, and upon execution of stored software instructions, the computing system may perform any of the exemplary processes described herein to authorize a performance of the initiated data exchange in accordance with the values of the one or more data-exchange parameters and using the available data type. The computing system may, in some instances, generate and transmit data that confirms the authorization of the performance of the initiated data exchange to the terminal device, e.g., directly across the communications network or indirectly through one or more intermediate devices or communications systems.

Further, and in response to the authorization of the initiated data exchange, the computing system may perform additional operations that generate and transmit data characterizing a context of the authorized data exchange to an additional computing system operating within the computing environment across a secure communications channel, e.g., through a secure application-to-application handshake or through a corresponding programmatic interface. By way of example, the contextual data may include, but is not limited to, data identifying or characterizing the client device (or the executed application program), data identifying or characterizing the terminal device, or a value of one or more parameters that characterize the initiated and authorized data exchange.

In some instances, the additional computing system may receive the contextual data, and perform operations that generate a template-based notification of contextual and temporal relevance to the authorized data exchange. The notification may, for example, include at least a portion of the received contextual data, along with additional data characterizing the device, the terminal device, and/or the authorized data exchange. Further, in some instances, the additional computing system may perform operations that establish a communications channel with the device, e.g., through a secure application-to-application handshake or through a corresponding programmatic interface, and transmit the notification to the device across the secure communications channel. As described herein, the notification may include data that instructs the device to render and present graphical, textual, or audible content representative of the context of the authorized data exchange on a corresponding interface.

In one example, the terminal device may correspond to a network-connected point-of-sale (POS) terminal associated with a merchant, and the initiated data exchange may facilitate an approval and an execution of a transaction initiated at terminal device by the computing system based on funds allocated to a payment instrument of a customer that participates in the initiated transaction. Additionally, in some aspects, the computer system may correspond to a network-connected computing system maintained by a financial institution that issues the payment instrument, may provide an approval of that initiated transaction to the POS terminal using any of the processes described herein.

The initiated transaction may, in some instances, correspond to a purchase transaction in which the customer purchases a good or service from the merchant at an agreed-upon price (e.g., a transaction amount), and the parameter values characterizing the initiated purchase transaction may include, but are not limited to, the transaction amount, data identifying the customer or the merchant, data identifying the purchased good or service, or a time or date associated with the initiated purchase transaction. Further, the customer may operate the client device, and in response to input provided to the client device by the customer (e.g., through a corresponding input unit), the executed application program may cause the client device to transmit data identifying the payment instrument (e.g., as provisioned to the client device) to the POS terminal across the direct communications channel. In some example, the payment instrument can include, but is not limited to, a credit or debit card accounts held by the customer and issued by one or more financial institutions (e.g., issuers), a checking or savings account held by the customer at one or more financial institutions, an electronic funds transfer (e.g., e-transfers), and other accounts held by or available to the customer and capable of funding the purchase transaction.

Certain of the exemplary, computer-implemented processes described herein, which generate template-based notifications of relevance to data exchanges initiated between a client device and a terminal device, and which provide the generated contextual notifications to the client device through secure application-to-application communication, may be implemented in addition to or as an alternate to conventional notification and messaging processes, such as those that provide notifications to the client device via email, text messaging, or other out-of-application communications channels. By facilitating post-transaction messaging through secure, application-to-application programmatic channels established by application-specific computing systems, certain of the disclosed embodiments may reduce the computational load on computer systems maintained by payment networks and issuers of payment instruments and further, reduce a potential exploitation of the contextual notifications by malicious third parties operating within the computing environment.

Further, in some examples, the client device may be configured by the executed application program to establish simultaneously secure communications channels with the terminal device, e.g., to initiate the data exchange with the terminal device, and with the additional computing system, e.g., to receive contextual notification data relevant to the initiated data exchanges. As described in greater detail below, and subsequent to the initiation of the purchase transaction with the terminal device, the client device may also be configured to provide data that identifies the customer and/or the merchant to the additional computing system across the securely established communications channel prior to the authorization of the initiated purchase transaction.

Certain of these additional computer-implemented processes, as described herein, enable the additional computing system to access or generate a notification template in parallel with the authorization of the initiated purchase transaction, and to provide a contextual notification based on the notification template to the client device in real time and contemporaneously with the authorization of the initiated purchase transaction. These exemplary computer-implemented processes may, in some aspects, be implemented in addition to or as an alternate to conventional notification and messaging processes, which provide contextual messaging to customers subsequent to an authorization of a corresponding purchase transaction, and may increase a speed and efficiency at which network-connected computing systems generate and provide contextual messaging to client device when compared to conventional notification and messaging processes, as described below.

I. Exemplary Computing Environments

FIG. 1 is a diagram illustrating an exemplary computing environment 100, consistent with certain disclosed embodiments. As illustrated in FIG. 1, environment 100 may include a client device 102, a point-of-sale (POS) terminal 122, an acquirer system 130, a payment network system 140, an issuer system 160, a tokenization system 170, and a contextual notification system 180, each of which may be interconnected to through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Further, as illustrated in FIG. 1, client device 102 and POS terminal 122 may also exchange data across a direct channel of communications, e.g., direct communication channel 120A. In one aspect, direct communications channel 120A may correspond to a wireless communications channel established across a short-range communications network, examples of which include, but are not limited to, a wireless LAN, e.g., a "Wi-Fi" network, a network utilizing RF communication protocols, a NFC network, a network utilizing optical communication protocols, e.g., infrared (IR) communications protocols, and any additional or alternate communications network, such as those described above, that facilitate peer-to-peer (P2P) communication between POS terminal 122 and client device 102.

POS terminal 122 may, in some instances, be associated with a merchant, e.g., merchant 121, and client device 102 may be associated with or operated by a customer of merchant 121, e.g., user 101. For example, POS terminal 122 may be disposed within a physical location of merchant 121, such as a location where a customer, e.g., user 101, provides payment for goods and/or services (e.g., at a cash register at merchant 121). In one aspect, client device 102 may correspond to a consumer payment device that, upon establishing communication with POS terminal 122 across communications channel 120A, provides data to POS terminal 122 specifying a payment instrument available for use in an initiated transaction for the goods and/or services.

The payment instrument may, in some instances, be issued to user 101 by a financial institution, e.g., a financial institution that operates issuer system 160, and issuer system 160 may perform operations that provide the executable payment application to client device 102 for storage within the one or more tangible, non-transitory memories. Payment instruments consistent with the disclosed embodiments include, but are not limited to, a credit or debit card accounts held by user 101, an account that includes units of one or more digital currencies held by user 101, a checking or savings account held by user 101 at one or more financial institutions, an electronic funds transfer, and/or other accounts held by or available to user 101 and capable of funding purchase transaction initiated at POS terminal devices operating within environment 100, such as POS terminal 122.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, such as a web browser, an application associated with issuer system 160 (e.g., a mobile application), and additionally or alternatively, a payment application associated with a payment service (e.g., a mobile application that establishes and maintains a mobile wallet), as described below.

Client device 102 may also establish and maintain, within the one or more tangible, non-tangible memories, one or more structured or unstructured data repositories or databases, e.g., data repository 106, that include device data 108 and payment application data 110. In one instance, device data 108 may include data that uniquely identifies client device 102, such as a media access control (MAC) address of client device 102 or an IP address assigned to client device 102.

Further, in additional instances, payment-application data 110 may include one or more identifiers of the payment application (e.g., a wallet address assigned to the mobile wallet established and maintained by the executed payment application), data identifying one or more payment instruments available to the executed payment application (e.g., tokenized data or cryptograms representative of the payment instruments provisioned to the established mobile wallet), and additional data supporting an operation of the executed payment application (e.g., a mobile wallet cryptogram provided to POS terminal 122 to validate the established mobile wallet, etc.). The disclosed embodiments are, however, not limited to these examples of device and payment-application data, and in further aspects, data repository 106 may include any additional or alternate data appropriate to client device 102 and the executed payment application.

Referring back to FIG. 1, client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input device 112B may include, but input not limited to, a keypad, keyboard, touchscreen, voice activated control technologies, or appropriate type of input device. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120 using any of the communications protocols described herein.

Further, in some aspects, client device 102 may include an interface unit 114, which can be configured by processor 104 to establish and maintain communications with POS terminal 122 (e.g., through interface unit 128 of FIG. 1) across communications channel 120A. For example, each of interface unit 114 and interface unit 128 may include a communications device, e.g., a wireless transceiver device, capable of exchanging data across communications channel 120A using any of the short-range communications protocols described above (e.g., NFC protocols, RF communications protocols, Bluetooth™ communication protocols, optical communications protocols, etc.). In other examples, interface unit 114 may include one or more electrical connectors capable of engaging with corresponding electrical connectors of interface unit 128 of POS terminal 122, or an electrical connector capable receiving a wired connection with POS terminal 122 (e.g., a USB connector, etc.).

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

POS terminal 122 may correspond to a computing device that includes one or more tangible, non-transitory memories storing data and/or software instructions, and one or more processors, e.g., processor 124, configured to execute the software instructions. The one or more tangible, non-transitory memories may, in some aspects, store software applications, application modules, and other elements of code, which when executed by the one or more processors, cause POS terminal 122 to perform operations consistent with the disclosed embodiments, as described below. Further, in certain aspects, POS terminal 122 may also store and maintain a data repository, e.g., data repository 126, within the one or more tangible, non-transitory memories. Data repository 126 may, for example, include terminal data 126A that uniquely identifies POS terminal 122 within network 120, a transaction log 126B that identifies transactions initiated at POS terminal 122 and authorized using any of the exemplary processes described herein, and/or acquirer data 126C that uniquely identifies a computer system (e.g., a MAC address, an IP address, etc.) of an entity, e.g., an acquirer, that administers POS terminal 122 and other POS terminals operating in environment 100.

As described above, POS terminal 122 may be disposed within a physical location of the merchant, such as a location where a customer, such as user 101, may provide payment for goods and/or services (e.g., at a cash register at the merchant). POS terminal 122 may, in some instances, include a display unit 127A configured to present interface elements to user 101, and an input unit 127B configured to receive input from user 101, e.g., in response to the interface elements presented through display unit 127A. By way of example, display unit 127A may include, but is not limited to, an LCD display unit or other appropriate type of display unit, and input device 127B may include, but input not limited to, a keypad, keyboard, touchscreen, voice activated control technologies, or appropriate type of input device. Further, in additional aspects (not depicted in FIG. 1), the functionalities of display unit 127A and input unit 127B may be combined into a single device, e.g., a pressure-sensitive touchscreen display unit that presents interface elements and receives input from user 101.

POS terminal 122 may also include a communications unit 127C, such as a wireless transceiver device, coupled to processor 124 and configured by processor 124 to establish and maintain communications with network 120 using any of the communications protocols described herein. Further, POS terminal 122 may include an interface unit 128, which may be configured by processor 124 to establish and maintain communications with client device 102 (e.g., through interface unit 114 of FIG. 1) across communications channel 120A. In some aspects, interface unit 128 may include a communications device, such as a wireless transceiver device, capable of exchanging data with client device 102 using any of the short-range communications protocols described above (e.g., NFC protocols, RF communications protocols, Bluetooth™ communication protocols, optical communications protocols, etc.).

Examples of POS terminal 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments. Further, although not depicted in FIG. 1, POS terminal 122 may also be coupled to a computing system associated with and maintained by merchant 121 (e.g., a cash register, etc.), which may include one more processors and one of more tangible, non-transitory memories storing one or more software applications, application modules, and other elements of code that, when executed by the one or more processors, cause the merchant computing system to exchange data with POS terminal 122 and perform operations consistent with the disclosed embodiments.

The disclosed embodiments are not limited to such POS terminals, and in additional aspects, POS terminal 122 may correspond to one or more application program modules executed by a computer system maintained by merchant 111, one or more computing systems operating within environment 100, one or more client devices operating within environment 100, such as client device 102. In other embodiments, POS terminal 122 may represent a device communicatively coupled to client device 102 to provide mobile point-of-sale and payment services, such as a Square™ device in communication with client device 102.

Referring back to FIG. 1, acquirer system 130, payment network system 140, acquirer system 160, tokenization system 170, and contextual notification system 180 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary transaction authorization and real-time notification processes described herein. In other instances, and consistent with the disclosed embodiments, one or more of acquirer system 130, payment network system 140, acquirer system 160, tokenization system 170, and contextual notification system 180 may correspond to a distributed system that includes computing components distributed across one or more networks, such as network 120, or other networks, such as those provided or maintained by cloud-service providers.

In some aspects, acquirer system 130 may perform operations that administer one or more POS terminal devices operating within environment 100, such as POS terminal 122. As illustrated in FIG. 1, acquirer system 130 may maintain, within the one or more tangible, non-transitory memories, POS terminal data 132 that identifies one or more of the POS terminal devices administered by acquirer system 130 (e.g., an IP address, MAC address, or other unique device identifier of POS terminal 122), and payment network data 134 that identifies one or more payment networks capable of clearing and settling purchase transaction initiated by POS terminals administered by acquirer system 130 (e.g., an IP address or other network identifier of payment network system 140).

Payment network system 140 may perform operations that clear and settle authorized purchase transactions in using one or more exemplary purchase transaction clearance and settlement processes. In certain aspects, and to facilitate a performance of these exemplary clearance and settlement processes, payment network system 140 may maintain acquirer data 142, issuer data 144, and tokenization service provider (TSP) data 146 within the one or more tangible, non-transitory memories. Acquirer data 142 may include data that uniquely identifies one or more acquirer computing systems that administer POS terminals operating within environment 100 (e.g., an IP address, MAC address, or other unique device identifier of acquirer system 130 that administers POS terminal 122). Further, in some instances, issuer data 144 may include data that uniquely identifies computer systems maintained by one or more issuers of payment instruments involved in purchase transactions initiated at POS terminal 122 (e.g., an IP address, MAC address, or other unique identifier of issuer system 160).

In additional instances, TSP data 146 may include information that uniquely identifies a network-connected computing system associated with one or more tokenization service providers operating within environment 100. For example, and as described herein, tokenization system 170 may provide tokenization services to payment network system 140 and additionally or alternatively, to issuer system 160, and TSP data may include an IP address, a MAC address, or another unique identifier of tokenization system 170 within a corresponding communications network, such as network 120 or direct communications channel 121B.

In some aspects, tokenization system 170 may, upon execution of stored software instructions, perform operations that provide tokenization services to payment network system 140 and additionally or alternatively, to issuer system 160. For example, tokenization system 170 may be configured to receive encrypted or tokenized requests to authorize purchase transactions initiated at POS terminal 122 by client device 102 (e.g., from payment network system 140 or issuer system 160), and to process decrypt or detokenize the received authorization requests prior to authorization processing by issuer system 160.

As illustrated in FIG. 1, and to facilitate the provision of these exemplary tokenization services, tokenization system 170 may maintain, within on or more tangible non-transitory memories, cryptographic data 172 and a token vault 174. Cryptographic data 172 may, in some instances, specify one or more private, public, or symmetric cryptographic keys capable of decrypting one or more authorization requests selectively encrypted by POS terminal 122. Further, in additional instances, token vault 174 may include structured data records that include tokenized data assigned to one or more payment instruments held by user 101 (and users of other client devices and payment devices operating within environment 100) and further, that associate the tokenized data with account numbers, expiration dates, card verification values, and other sensitive account data that facilitate an authorization, by issuer system 160, of purchase transactions involving the payment instruments.

Issuer system 160 may maintain, within the one or more tangible, non-transitory memories, data that facilitates an authorization of purchase transactions initiated at POS terminal devices operating within environment 100 and involving issued payment instruments available to user 101, e.g., as specified by data provided to POS terminal 122 by client device 102 across communications channel 120A. For example, as illustrated in FIG. 1, issuer system 160 may maintain customer account data 162 that identifies underlying accounts (e.g., account numbers, expiration dates, card verification values, etc.) associated with each of the payment instruments issued by issuer system 160 and tokenization service provider (TSP) data 164 that identifies a network-connected computing system associated with one or more tokenization service providers operating within environment 100.

By way of example, and for a corresponding one of the payment instruments (e.g., a Visa™ credit card held by user 101), customer account data 162 may include, but is not limited to, data identifying the Visa™ credit card (e.g., the account number, expiration data, card verification value, etc.), a current account balance, or values of other usage parameters of the Visa™ credit card. Further, and as described herein, tokenization system 170 may provide tokenization services to payment network system 140 and additionally or alternatively, to issuer system 160, and TSP data may include an IP address, a MAC address, or another unique identifier of tokenization system 170 within a corresponding communications network, such as network 120 or direct communications channel 121C.

Further, issuer system 160 may also maintain, within the one or more tangible, non-transitory memories, notification system data 166 that identifies one or more network-connected computing systems capable of providing contextual notifications of authorized purchase transactions to one or more computing systems and devices operating within environment 100, such as contextual notification system 180 of FIG. 1. In some instances, notification system data 166 may include data that identifies a unique network address of contextual notification system 180 within communications network 120 (e.g., an IP address, a MAC address, or other unique network address) and additionally or alternatively, data identifying a programmatic interface that facilitates secure application-to-application communication between issuer system 160 and contextual notification system 180.

By way of example, and based on contextual data characterizing a purchase transaction authorized by issuer system 160, contextual notification system 180 may perform any of the exemplary processes described herein to generate notification data that is contextually and temporally relevant to the authorized purchase transaction, and to transmit that notification data to a client device associated with the authorized purchase transaction, such as client device 102. In some aspects, contextual notification system 180 may be configured to generate and transmit the notification data subsequent to, but contemporaneously with, the authorization of the purchase transaction by issuer system 160, and contextual notification system 180 may transmit the contextual notification data to client device 102 across network 120 through a programmatic interface maintained by an application program executed by client device 102.

Contextual notification system 180 may maintain, within one or more tangible, non-transitory memories, data that facilitates the generation of one or more notifications of contextual and temporal relevance to a purchase transaction authorized by issuer system 160, and the provision of the generated notifications directly to a client device associated with that authorized purchase transaction via application-to-application communication. By way of example, as illustrated in FIG. 1, contextual notification system 180 may establish and maintain a customer database 182, a merchant database 184, a contextual data store 186, a template data store 188, and a content data store 190 within the one or more tangible, non-transitory memories.

In some aspects, customer database 182 may include structured or unstructured data records identifying and characterizing one or more customers that "opted-in" to participate in the contextual notification and messaging processes described herein. For example, user 101 may access a digital portal associated with contextual notification system 180, e.g., through a web page rendered and presented on display unit 112A by a web browser executed by client device 102, or through a graphical user interface (GUI) generated and presented on display unit 112A by an application program executed by client device 102, such as the payment application described herein. The presented web page or GUI may include digital content (e.g., rendered text, graphics, other interface elements, etc.) that prompts user 101 to register or "opt-in" for notifications generated by contextual notification system 180, and in some instances, user 101 may provide, to client device 102 via input unit 112A, registration data that confirms an intention of user 101 to opt-in and receive the contextual notifications from notification system 130. Client device 102 may receive the registration data, and may perform operations that package portions of the registration data into a corresponding registration request, which client device 102 may provide to contextual notification system 180 across network 120, e.g., through a corresponding programmatic interface.

The registration data may, for example, include a unique identifier of user 101 (e.g., a login credential associated with user 101 and/or the executed application program), data identifying client device 102 (e.g., a mobile telephone number associated with user 101 and assigned to client device 102), and data characterizing a mailing address of a residence of user 101. The registration data may further include data specifying one or more demographic characteristics of user 101, such as, but not limited to age, gender, educational level, occupation, income, residence, native, spoken, or preferred language, civil or marital status, or number of children. In further aspects, and in addition to the portions of the received registration data, client device 102 may also include, within the request, data identifying a network address of client device 102 (e.g., an IP address, a MAC address, or other unique identifier of client device 102 within network 120) or data identifying or characterizing the executed application program, such as data identifying a programmatic interface associated with the executed application program.

In some aspects, contextual notification system 180 may receive the request from client device 102, and may perform operations that store portions of the received request within one or more of the structured data records of customer database 182. Additionally, in some aspects, contextual notification system 180 may generate, and store within customer database 182, additional information that identifies and characterizes certain portions of the stored data and, in some aspects, facilitates an access and retrieval of the stored data portions by contextual notification system 180. For example, the additional data may include metadata that identifies or "tags" portions of the stored data and in some instances, enables contextual notification system 180 to selectively access and retrieve elements of "tagged" data for inclusion within one or more notification templates, as described herein.

Referring back to FIG. 1, merchant database 184 may include structured or unstructured data records identifying and characterizing one or more merchants that participate in the contextual notification and messaging processes described herein. For example, contextual notification system 180 may generate and transmit, to one or more client devices within environment 100, notifications of contextual and temporal relevance to authorized purchase transactions initiated between POS terminal 122 and one or more client devices, such as client device 102. In some instances, merchant database 182 may include, for merchant 121, data records that include a unique identifier of merchant 121

(e.g., merchant name), identifiers of one or more terminal devices associated with or operated by merchant 121 (e.g., an IP address, MAC address, or other unique network identifier of POS terminal 122), and additional data that characterizes or merchant 121 or POS terminal 122, such as an address of merchant 121 or a geographic location of POS terminal 122.

Contextual data store 186 may include structured or unstructured data records identifying and characterizing a context one or more purchase transactions authorized by issuer system 160. For example, and as described herein, contextual notification system 180 may receive contextual data that identifies and characterizes a purchase transaction initiated by client device 102 at POS terminal 122 and authorized by issuer system 160. In some instances, the received contextual data may include, but is not limited to, identifiers of client device 102 and POS terminal 122 (e.g., IP addresses, MAC addresses, or other unique identifiers), an identifier of a product or service involved in the authorized purchase transaction, a transaction amount of the authorized purchase transaction, a transaction data or time, and values of other parameters that characterize the authorized purchase transaction. In some aspects, contextual notification system 180 may perform operations that store portions of the received contextual data, which characterizes the purchase transaction authorized by issuer system 160, within one or more of the structured or unstructured data records of contextual data store 186.

Template data store 188 may include template data identifying and characterizing notification templates that, when processed by contextual notification system 180, facilitate a generation of notification data having contextual and temporal relevance to corresponding purchase transactions authorized by issuer system 160. In some aspects, the template data may specify, for each of the notification templates, one or more elements of digital content (e.g., textual content, graphical content, audio or visual content, etc.) for inclusion within the generated notification data. Further, the template data characterizing each of the notification templates may also include formatting data that establishes visual characteristics of the one or more elements of digital content when displayed within rendered notification data on a corresponding interface, and additionally or alternatively, positions of the displayed elements of digital within the corresponding interface. Template data store 188 may also include data, e.g., structural data, characterizing a structure of one or more notification templates generated dynamically by contextual notification system 180 through the exemplary processes described herein.

Content data store 190 may include a plurality of elements of digital content suitable for incorporation into the dynamically generated notification templates. In some aspects, content data store 190 may also include, for each of the digital content elements, additional data (e.g., metadata) associating that digital content elements with one or more customer demographic characteristics.

II. Exemplary Computer-Implemented Processes for Generating and Provisioning Contextual Notifications to Network-Connected Devices In some embodiments, a client device, e.g., client device 102, may perform operations that initiate an exchange of data with a network-connected device, such as POS terminal 122, across a direct channel of communications, e.g., communications channel 120A. As described herein, the initiated data exchange may be characterized by a value of one or more data-exchange parameters, and POS terminal 122, in conjunction with acquirer system 130, payment network system 140, issuer system 160, and tokenization system 170, may perform operations that authorize a performance of the initiated data exchange in accordance with the values of the one or more data-exchange parameters.

Further, and as described herein, issuer system 160 may perform additional operations that generate and transmit, to contextual notification system 180, contextual data that characterizes the authorized data exchange. The contextual data may, for example, include the value of the one or more data-exchange parameters and identifiers of client device 102 and POS terminal 122 (e.g., corresponding IP addresses, MAC addresses, or other unique network addresses). Contextual notification system 180 may receive the contextual data from issuer system 160, and in some aspects, may perform any of the exemplary processes described herein to generate, and transmit to client device 102, notifications of contextual and temporal relevance to the authorized data exchange across an established communications channel.

The initiated data exchange may, in certain instances, correspond to a purchase transaction initiated at POS terminal 122 by a customer of merchant 121, e.g., user 101. For example, user 101 may elect to purchase a sweater from merchant 121 (e.g., a Nordstrom™ department store in Washington, D.C.) for an agreed-upon price of $50.00 (e.g., the transaction amount). A computing system maintained by merchant 121 (e.g., a cash register) may obtain transaction data characterizing the initiated transaction, such as an identifier of the product or products involved in the transaction (e.g., a universal product code (UPC) assigned to the sweater) and the corresponding transaction amount (e.g., $50.00), and provide the obtained transaction data to POS terminal 122 across any appropriate wired or wireless connection.

POS terminal device 122 may receive the transaction data from the merchant computing system, and may perform operations that generate interface elements representative of portions of the received transaction data, which POS terminal 122 may present within a graphical user interface (GUI) displayed on display unit 127A. In response to the presented interface elements, which may prompt user 101 to provide a payment instrument capable of funding the $50.00 transaction amount of the initiated transaction, user 101 may dispose client device 102 proximate to POS terminal 122, and interface unit 114 of client device 102 may establish communications channel 120A with POS terminal 122 (e.g., through the communications device included within interface unit 128 of POS terminal 122 using any of the short-range, wireless communication protocols described above). Processor 104 of client device 102 may execute a payment application (e.g., a mobile wallet application) that causes client device 102 to present, to user 101 through display unit 112A, interface elements that identify one or more payment instruments maintained within a mobile wallet established by the executed payment application and available to fund the initiated transaction, such as a Visa™ credit card.

Figure 2A:
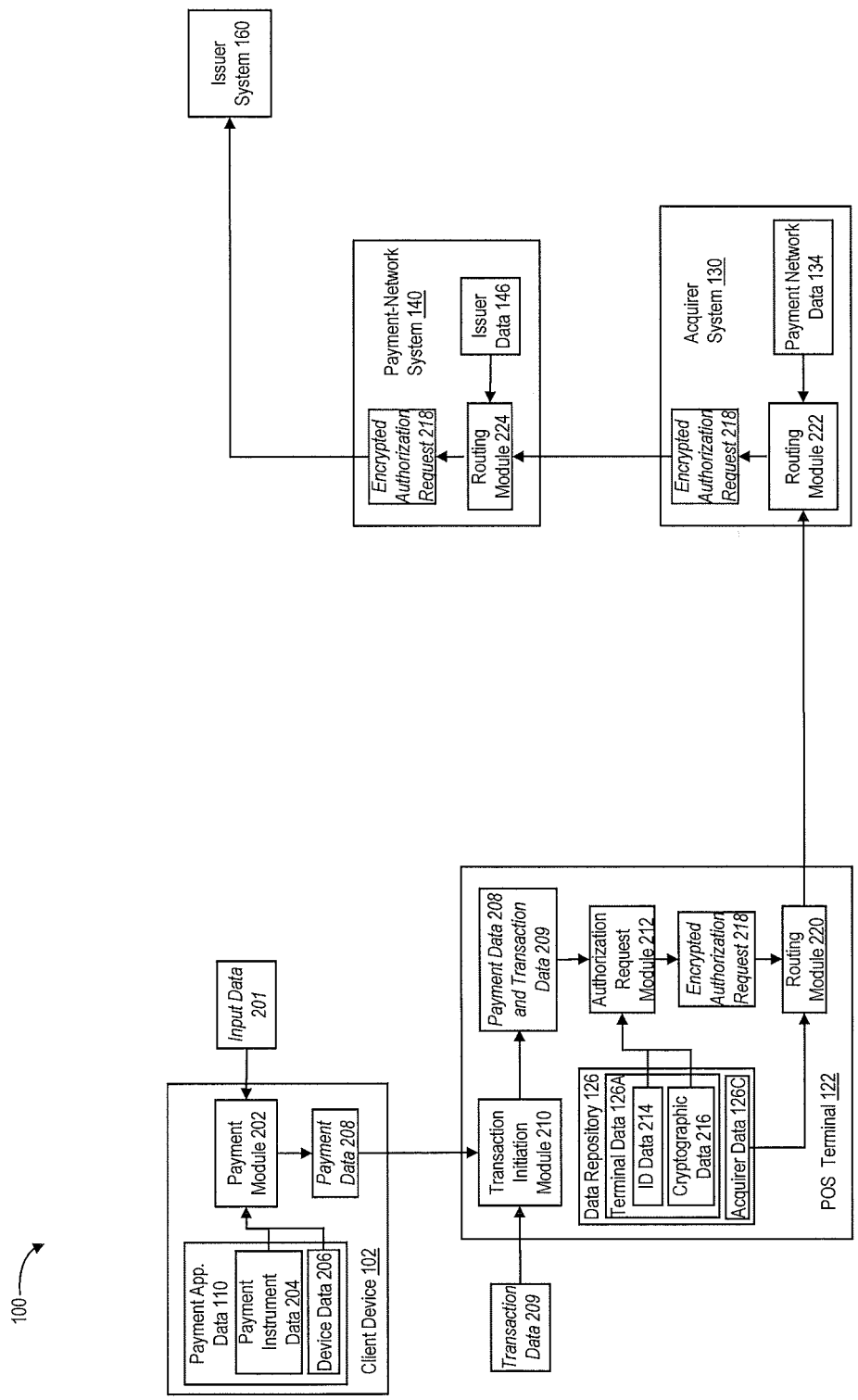
FIGS. 2A-2D, 3A, and 3B are diagrams illustrating portions of an exemplary computing environment, consistent with the disclosed embodiments.

Referring to FIG. 2A, a payment module 202 of client device 102 may receive, through input unit 112B, input data 201 that identifies the payment instrument selected for use in the initiated transaction (e.g., the Visa™ credit card). In some aspects, payment module 202 may process input data 201 to obtain an identifier of the selected payment instrument, and based on the obtained identifier, perform operations that access and load a portion of payment application data 110 that corresponds to the selected payment instrument. Payment module 202 may access payment application data 110 (e.g., as maintained within data repository 106), and load payment instrument data 204 that identifies an account number, an expiration data, and/or a card verification value assigned to the Visa™ credit card, along with additional or alternate payment instrument or customer data that facilitates an authorization of the initiated transaction by payment network system 140 or issuer system 160.

In some examples, payment instrument data 204 may include elements of sensitive data susceptible to exposure and compromise when transmitted between computing systems and devices operating within environment 100, e.g., across communications network 120 or direct communications channel 120A. To mitigate a risk of exposure or compromise, one or more of these sensitive data elements may be replaced within a non-sensitive representation of that data element, e.g., a token, having no extrinsic or exploitable meaning or value. For instance, the account number of the Visa™ credit card, as maintained within payment application data 110 by payment module 202, may not correspond to the actual account number generated by issuer system 160, but may instead correspond to a tokenized representation of that account number generated by a tokenization service provider associated with issuer system 160 or payment network 140, e.g., tokenization system 170 of FIG. 1.

Referring back to FIG. 2, payment module 202 may perform additional operations that access and load, from corresponding portions of data repository 106, device data 206 that uniquely identifies client device 102 within communications network 120 (e.g., an IP address, a MAC address, a unique identifier of user 101, etc.). Payment module 202 may package portions of payment instrument data 204 and device data 206 into payment data 208, which client device 102 may transmit across communications channel 120A to POS terminal 122 using any of the short-range communications protocols outlined above. In some examples, not illustrated in FIG. 2, payment data 208 may also include data that identifies and authenticates the mobile wallet established and maintained by payment module 202, such a mobile wallet token or a unique mobile wallet address.

A transaction initiation module 210 of POS terminal 122 may receive payment data 208 from client device 102, and further, may receive transaction data 209 from the merchant computing system, e.g., the cash register operated by merchant 121. Transaction data 209 may, for example, include data characterizing the initiated transaction, such as, but not limited to, an identifier of the product or products involved in the transaction (e.g., the UPC assigned to the article of clothing) and the corresponding transaction amount (e.g., $50.00). In some aspects, transaction initiation module 210 may provide portions of payment data 208 and transaction data 209 as an input to an authorization request module 212, which may perform any of the exemplary processes described herein to generate a selectively encrypted authorization request that corresponds to the initiated transaction.

For example, authorization request module 212 may receive the payment data 208 and transaction data 209, and may perform additional operations that access and load data identifying POS terminal 122, e.g., terminal identification data 214, from a corresponding portion of data repository 126, e.g., from terminal data 126A. In some instances, terminal identification data 214 may include a unique network address of POS terminal 122 within communications network 120, such as an IP address or a MAC address. In other instances, terminal identification data 214 may include a POS cryptogram that uniquely identifies POS terminal 122, which may be generated and assigned to POS terminal 122 by payment network system 140.

In additional aspects, authorization request module 212 may perform operations that identify and selectively encrypt one or more sensitive portions of payment data 208 (e.g., which includes payment instrument data 204 and device identification data 206) and terminal identification data 214. For example, as illustrated in FIG. 2, data repository 126 may maintain cryptographic data 216 that identifies and characterizes a cryptographic key available and suitable for encrypting the one or more sensitive portions of payment data 208 and terminal identification data 214 for transmission across communications network 120.

In one instance, cryptographic data 216 may include a symmetric encryption key generated by or provided to POS terminal 122. In other instances, and consistent with the disclosed embodiments, cryptographic data 216 may include a public cryptographic key associated with and generated by tokenization system 170 or other computing systems operating in environment 100, such as payment network system 140. The disclosed embodiments are, however, not limited to these examples or symmetric encryption keys or public cryptographic keys, and in other aspects, cryptographic data 216 may include data that identifies any additional or alternate cryptographic key, or combination of cryptographic keys.

In some aspects, authorization request module 212 may access and load the cryptographic key from cryptographic data 216, and perform operations that encrypt all or a portion of payment data 208 and terminal identification data 214 using the loaded cryptographic key. For example, and as described herein, the loaded cryptographic key may correspond to the public cryptographic key generated by tokenization system 170, and authorization request module 212 may encrypt all portions (e.g., both sensitive and insensitive data) of payment data 208 and terminal identification data 214 using the public cryptographic key of tokenization system 170.

Authorization request module 212 may perform additional operations that package the selectively encrypted payment data 208 and terminal identification data 214 into an encrypted authorization request 218. In some aspects, portions of selectively encrypted payment data 208 may include tokenized representations of sensitive account information (e.g., tokenized account numbers, expiration dates, card verification values, etc.), and encrypted authorization request 218 may correspond to a tokenized authorization request (e.g., an "authorization token") that further masks sensitive account, customer, and terminal data during transmission across communications network 120.

Additionally, and by way of example, encrypted authorization request 218 may be structured by authorization request module 212 to include header data and payload data. In some instances, the header data may include, but is not limited to, data that identifying the cryptographic key loaded from cryptographic data 216 (e.g., the public cryptographic key of tokenization system 170). Further, the payload data may include, but is not limited to, payment data 208 and terminal identification data 214, as selectively encrypted by authorization request module 212 using the loaded cryptographic key, and the applied digital signature.

In some aspects, authorization request module 212 may perform additional operations that provide encrypted (and/or tokenized) authorization request 218 as an input to a routing module 220 of POS terminal 122. For example, routing module 220 may access and load a network address of acquirer system 130 from acquirer data 126C (e.g., the MAC address or the IP address of acquirer system 130). Further, routing module 220 may perform operations that transmit encrypted (and/or tokenized) authorization request 218 across network 120 to the network address of acquirer system 130, e.g., through communications unit 127C using any of the communications protocols outlined above.

As illustrated in FIG. 2A, a routing module 222 of acquirer system 130 may receive encrypted authorization request 218 from POS terminal 122. In some examples, routing module 222 may access payment network data 134 and extract a network address of payment network system 140 (e.g., a MAC address or an IP address). In certain aspects, routing module 222 may transmit encrypted authorization request 218 across network 120 to the extracted network address of payment network system 140, e.g., using any of the communications protocols described above.

A routing module 224 of payment network system 140 may receive encrypted authentication request 218 from acquirer system 130, which received and relayed encrypted authentication request 218 from POS terminal 122. In some aspects, routing module 224 may access issuer data 146 and extract a network address of an issuer system associated with the selected payment instrument (e.g., a MAC address or IP address of issuer system 160, which issued the payment instrument identified and characterized by encrypted and/or tokenized payment instrument data 204). Routing module 224 may transmit encrypted authorization request 218 across network 120 to the extracted network address of issuer system 160, e.g., using any of the communications protocols described above.

Figure 2B:
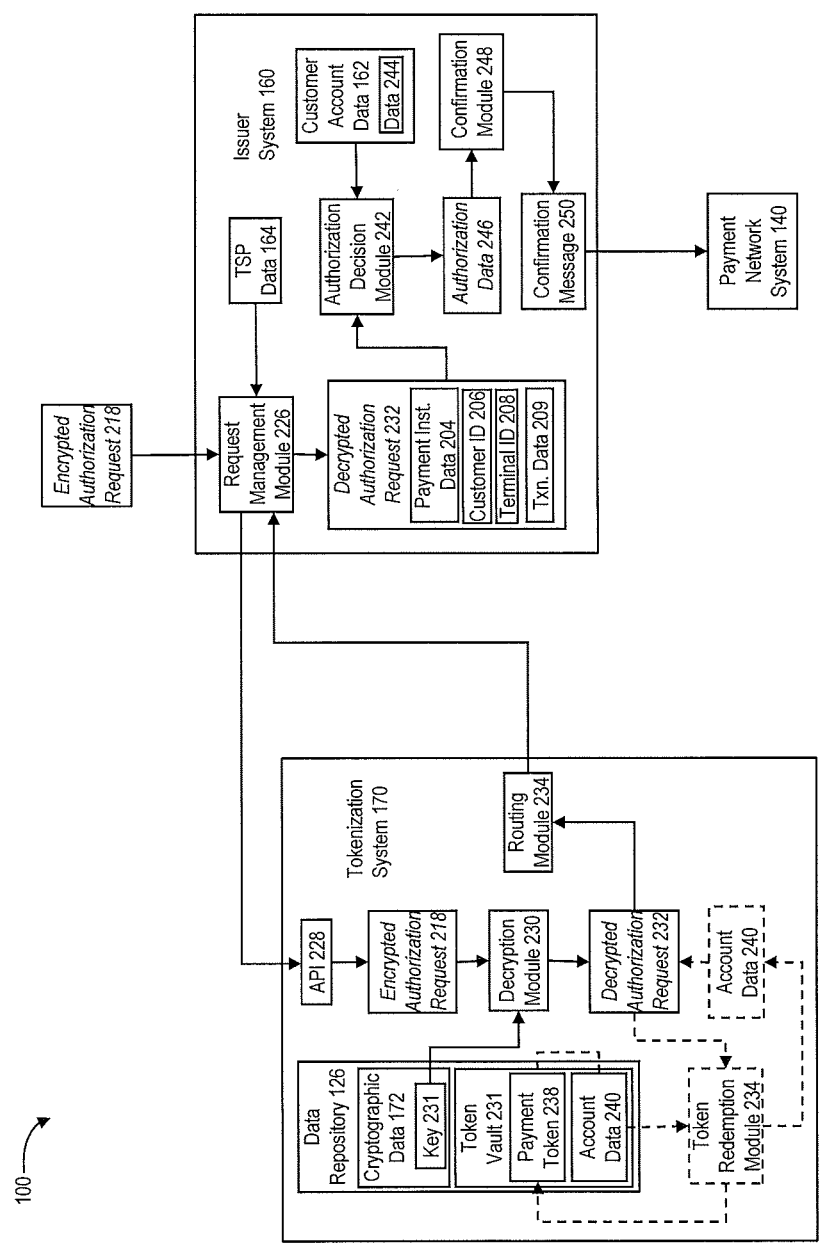

As illustrated in FIG. 2B, a request management module 226 of issuer system 160 may receive encrypted authorization request 218, and in conjunction with tokenization system 170, may perform operations that decrypt and/or de-tokenize encrypted authorization request 218. In some instances, and responsive to the receipt of encrypted authorization request 218, request management module 226 may access stored TSP data 164 (e.g., as maintained within one or more tangible, non-transitory memories) and load data identifying a computing system of a corresponding tokenization service provider capable of decrypting and/or de-tokenizing encrypted authorization request 218.

For example, and based on portions of TSP data 164 and encrypted authorization request 218, request management module 226 may establish that tokenization system 170 is capable of decrypting and/or de-tokenizing encrypted authorization/request 220. In some instances, request management module 226 may load, from TSP data 164, a network address that uniquely identifies tokenization system 170 within network 120, such as an IP address or a MAC address, and issuer system 160 may be configured to transmit encrypted authorization request 218 to the network address of tokenization system 170, e.g., using any of the communications protocols outlined above.

In certain aspects, a programmatic interface established and maintained by tokenization system 170, such as application programming interface (API) 228, may receive encrypted authorization request 218 from issuer system 160. By way of example, API 228 may be associated with, and established and maintained by a decryption module 230 of tokenization system 170, and may facilitate direct, module-to-module communications between request management module 226 of issuer system 160 and decryption module 230. API 228 may provide encrypted authorization request 218 as an input to decryption module 230, and as described below, decryption module 230 may perform operations that decrypt encrypted authorization request 218 based on one or more locally stored or locally generated cryptographic keys.

By way of example, tokenization system 170 may maintain, within one or more tangible, non-transitory memories, cryptographic data 172 that includes one or more cryptographic keys capable of selectively decrypting authorizations requests transmitted to tokenization system 170 by issuer system 160, and additionally or alternatively, by payment network system 140. In some aspects, decryption module 230 may perform operations that identify one of the stored cryptographic keys that is associated with and capable of decrypting encrypted authorization request 218, e.g., cryptographic key 231.

In one instance, described herein, authorization request module 212 of POS terminal 122 may generate encrypted authorization request 218 using a public cryptographic key associated with and generated by tokenization system 170, and cryptographic key 231 may correspond to a private counterpart of that public cryptographic key (e.g., a private cryptographic key associated with or generated by tokenization system 170). In other instances, POS terminal 122 may generate encrypted authorization request 218 using a locally generated or locally stored symmetric encryption key, and cryptographic key 231 may correspond to a counterpart symmetric encryption key generated or stored locally by tokenization system 170. These disclosed embodiments are, however, not limited to these examples of cryptographic key 231, and in other aspects, cryptographic key 231 may correspond to any additional or alternate cryptographic or encryption key capable of decrypting encrypted authorization request 218, including a combination of cryptographic or encryption keys maintained within cryptographic data 172.

Further, in some instances, one or more portions of encrypted authorization request 218 may identify an encryption scheme applied by authorization request module 212 of POS terminal 122 to generate encrypted authorization request 218. For example, a header portion of encrypted authorization request 218 may include data specifying the encryption scheme (e.g., encryption using the public cryptographic key associated with and generated by tokenization system 170 or the symmetric encryption key, etc.). Decryption module 230 may, in certain aspects, process the header portion of encrypted authorization request 218 to extract data identifying and characterizing the encryption scheme, and identify a corresponding one of the locally stored cryptographic keys, e.g., cryptographic key 231, that is consistent with the identified extracted data.

Decryption module 230 may perform operations that load cryptographic key 231 from a corresponding portion of cryptographic data 172, and apply cryptographic key 231 to portions of encrypted authorization request 218 to generate and output a decrypted authorization request 232. In some instances, decryption module 230 may provide decrypted authorization request 232 as an input to a routing module 234, which may transmit decrypted authorization request 232 across network 120 to issuer system 160, e.g., using any of the communications protocols described herein.

Additionally, and as described above, decrypted authorization request 232 may include one or more tokenized representations of sensitive data included within one or more portions of payment instrument data 204, device identification data 206, and/or terminal identification data 208. For example, instead of specifying the account number of the selected Visa™ credit card, payment instrument data 204 may include an account number token that is similar in structure and format to the account number (e.g., having a similar length, etc.), but that has no exploitable value to malicious third parties operating within environment 100. In other examples, payment instrument data 204 may include additional or alternate tokens that replace and mask one or more portions of the account number, such as the last four digits, and further, portions of the expiration date, the card verification value, or other portions sensitive data incorporated within payment instrument data 204. In other examples, device identification data 206 and/or terminal identification data 208 may also include one or more tokens that mask portions of the IP addresses, MAC addresses, or other unique identifiers of corresponding ones of client device 102 and/or terminal device 122.

Prior to transmitting decrypted authorization request 232 to issuer system 160, tokenization system 170 may further process decrypted authorization request 232 to replace each of the tokenized representations with corresponding elements of sensitive account, device, and/or terminal data. By way of example, a token redemption module 236 may receive decrypted authorization request 232, and process decrypted authorization request 232 to identify an existence of a token, such as a payment token 238, that masks a portion of sensitive account information within payment instrument data 204, such as the account number of the selected Visa™ credit card. Further, and upon identification of payment token 238, token redemption module 236 may perform operations that access a token vault maintained within the one or more tangible, non-transitory memories, e.g., token vault 174, and that identify one or more elements of sensitive account data 240 (e.g., the account number of the selected Visa™ credit card) that are associated with, and represented by, payment token 238. For instance, token redemption module 236 may access a data record within token vault 174 associated with payment token 238 and extract, from that data record or from one or more additional linked data records of token vault 174, the one or more elements of sensitive account data 240.

Token redemption module 236 may further process decrypted authorization request 232 to replace payment token 238 with the one or more associated elements of sensitive account data 240 (e.g., the "redeem" payment token 238). Additionally, although not illustrated in FIG. 2B, token redemption module 236 may perform similar operations on decrypted authorization request 232 to replace one or more additional payment tokens within corresponding elements of sensitive account data (e.g., additional or alternate portions of the account number, expiration date, card verification value, etc.), to replace one or more additional tokens representative of elements of sensitive device data with these sensitive device data elements, and additionally or alternatively, to replace one or more additional tokens representative of elements of sensitive terminal data with these sensitive terminal data elements. Tokenization system 170 may perform any of the exemplary processes described herein to transmit detokenized and decrypted authorization request 232 across network 120 to issuer system 160.

As illustrated in FIG. 2B, request management module 226 of issuer system 160 may receive decrypted authorization request 232 from tokenization system 170. In some instances, and as described herein, tokenization system 170 may also perform any of the exemplary processes described herein to detokenize decrypted authorization request 232 prior transmitting decrypted authorization request 232 to issuer system 160.

For example, decrypted authorization request 232 may include payment instrument data 204 that identifies the payment instrument selected to fund the transaction, such as, but not limited to, the primary account number, expiration date, and/or card verification value assigned to the selected Visa™ credit card. Additionally, decrypted authorization request 232 may also include device identification data 206 that uniquely identifies client device 102 and terminal identification data 208 that uniquely identifies POS terminal 122. Examples of device identification data 206 and terminal identification data 208 may include, but are not limited to, an IP address, a MAC address, a unique cryptogram, or other unique device identifier. As further illustrated in FIG. 2B, decrypted authorization request 232 may include transaction data 209 that characterizes the transaction initiated at POS terminal 122, such as, but not limited to, a transaction value, an identifier of a product or service involved in the transaction (e.g., a UPC assigned to the purchased sweater), and/or a transaction date or time.

In some aspects, request management module 226 may provide decrypted authorization request 232 as an input to an authorization decision module 242, which may perform operations that authorize the initiated transaction in accordance with the transaction parameter values (e.g., as specified within transaction data 209) and using the selected payment instrument (e.g., as specified within payment instrument data 204). In one example, and without limitation, authorization decision module 242 may be configured to authorize the initiated transaction in response to a successful verification of the selected payment instrument, and additionally or alternatively, a successful verification of payment network system 140 or a successful verification of decrypted authorization request 232.

Authorization decision module 242 may process decrypted authorization request 232 to extract, among other things, the transaction value that characterizes the initiated transaction (e.g., $50.00) and account data that characterizes the selected payment instrument (e.g., the account number, expiration data, and/or card verification value of the selected Visa™ credit card). Further, authorization decision module 242 may also access stored data that characterizes a current account status of one or more payment instruments issued by the financial institution that maintains issuer system 160 (e.g., within account database 162), and load one or more data records 244 of account database 162 that characterize the current status of the selected payment instrument. Data records 244 may specify, among other things, a current account status of the selected Visa™ credit card (e.g., whether the account is delinquent), a current account balance of the selected Visa™ credit card, a credit limit established for the selected Visa™ credit card, and/or values of other account parameters that characterize the selected Visa™ credit card.

For example, data records 244 may indicate that a current account balance of the selected Visa™ credit card is $225.50, and the credit limit established for the selected Visa™ credit card is $2,000.00. In some aspects, authorization decision module 242 may determine that the $50.00 transaction value of the initiated purchase would fail to increase the current account balance of the selected Visa™ credit card above the established credit limit of $2,000.00, and may determine to authorize the initiated $50.00 purchase using the selected Visa™ credit card. In other aspects, authorization decision module 242 may predicate the decision to authorize the initiated transaction based on additional or alternate factors that include, but are not limited to, a magnitude of the transaction value that characterizes the initiated transaction, a velocity of transactions involving the Visa™ credit card account and/or POS terminal 122, one or more balance or credit-limit thresholds established by user 101 or issuer system 160, and other authorization factors or rules, such as those that characterize a risk of fraud or compromise (e.g., that the initiated transaction diverges from a transaction pattern of user 101 and/or the selected Visa™ credit card).

In some aspects, and in response to the determination to authorize the initiated $50.00 transaction using the selected payment instrument, authorization decision module 242 may generate authorization data 246 that includes a generated authorization code and data that characterizes the authorized purchase transaction (such as the authorized transaction amount, the parties to the authorized transaction, etc.). In some aspects, authorization decision module 242 may provide authorization data 246 to a confirmation module 248, which may package portions of authorization data 246 into a confirmation message 250, and issuer system 160 may transmit confirmation message 250 across network 120 to payment network system 140 using any of the communications protocols described above.

Figure 2C:
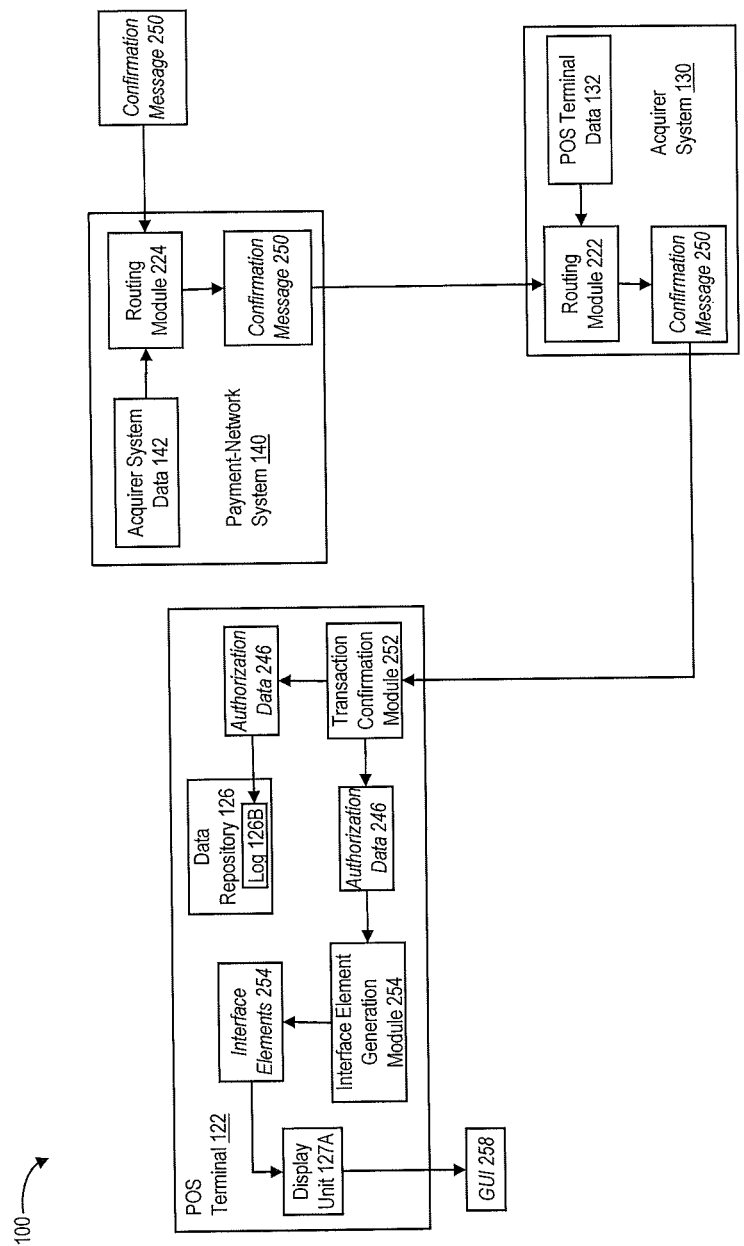
Figure 2D:
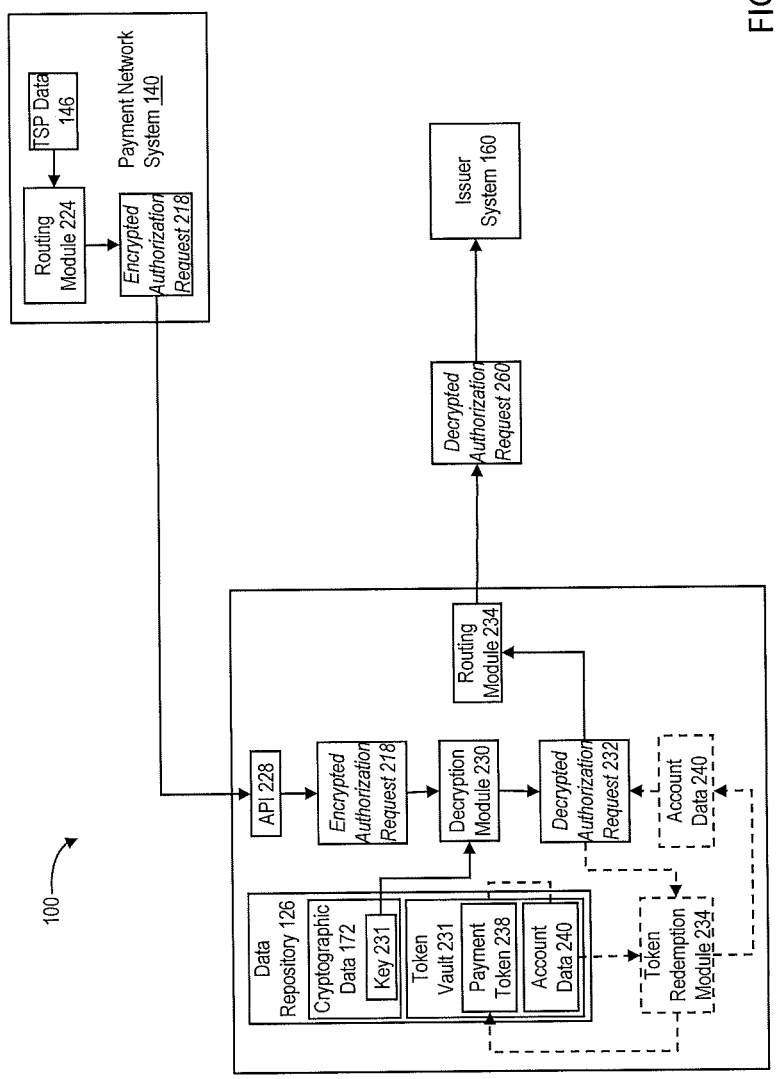

As illustrated in FIG. 2C, a routing module 224 of payment network system 140 may receive confirmation message 250 from issuer system 160, and may perform any of the processes described above to route confirmation message 250 to acquirer system 130 across network 120. Further, routing module 222 of acquirer system 130 may receive confirmation message 250 from payment network system 140, may perform any of the processes described above to route confirmation message 250 to acquirer system 130 across network 120.

POS terminal 122 may receive confirmation message 250 through communications unit 127C, and a transaction confirmation module 252 may perform operations that extract authorization data 246 from confirmation message 250. In some aspects, authorization data 246 may include the authorization code and the additional data that characterizes the authorized transaction (e.g., the authorized transaction amount, the parties to the authorized transaction, etc.), which POS terminal 122 store within one or more data records of transaction log 126B, along with additional values of transaction parameters, such as, but not limited to, a transaction time and date or a transaction location.

Transaction confirmation module 252 may also provide authorization data 246 to an interface element generation module 254, which may process authorization data 246 to generate one or more interface elements 256. In some aspects, interface element generation module 254 may provide generated interface elements 256 to display unit 127A, which may present interface elements 256 within a graphical user interface (GUI) 258 that identifies the authorization code and confirms the authorization of the initiated transaction.

In some exemplary embodiments, issuer system 160 may be configured to receive encrypted authorization requests (e.g., encrypted authorization request 218 of FIGS. 2A and 2B) from payment network system 140, and in conjunction with tokenization system 170, may perform operations that decrypt and/or de-tokenize encrypted authorization request 218. In other embodiments, described below in reference to FIG. 2D, routing module 224 of payment network system 140 may be configured to access stored TSP data 148 and load a unique network identifier of tokenization system 170 (e.g., an IP address or a MAC address).

Figure 3A:
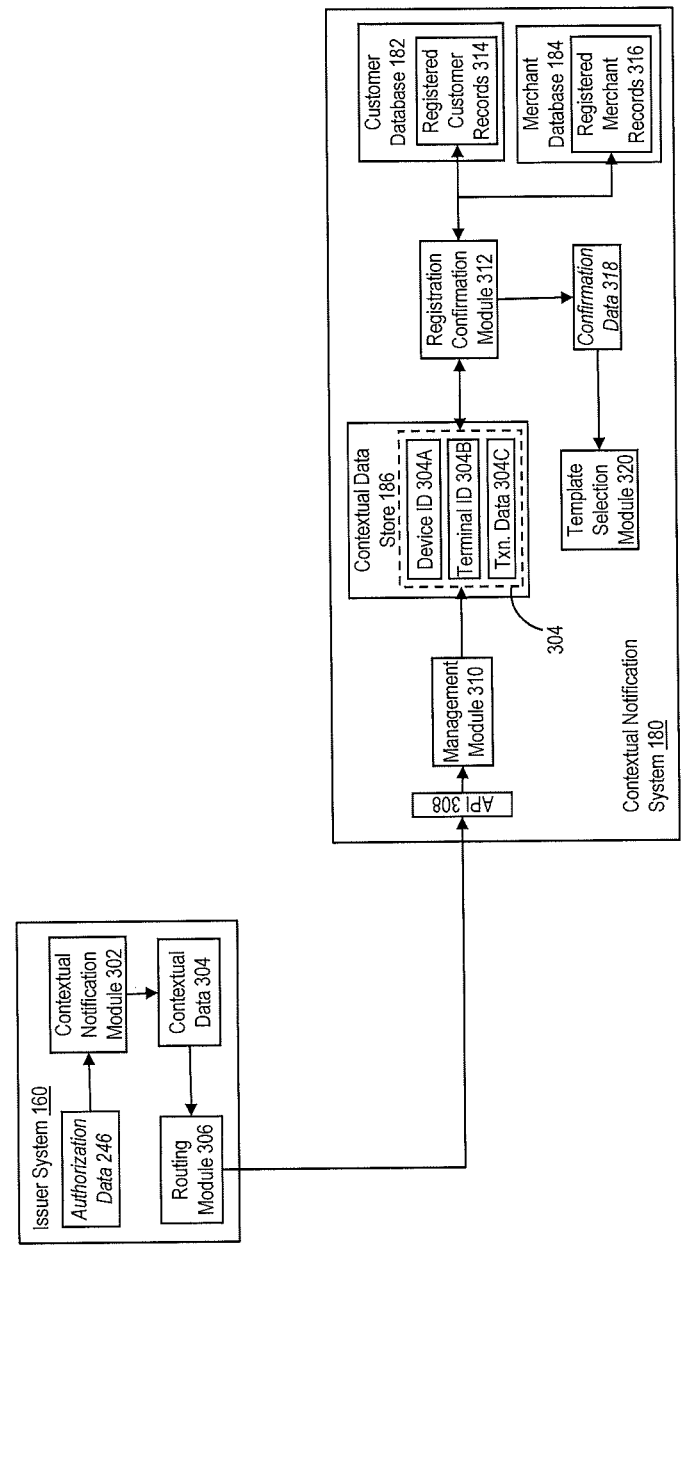
Figure 3B:
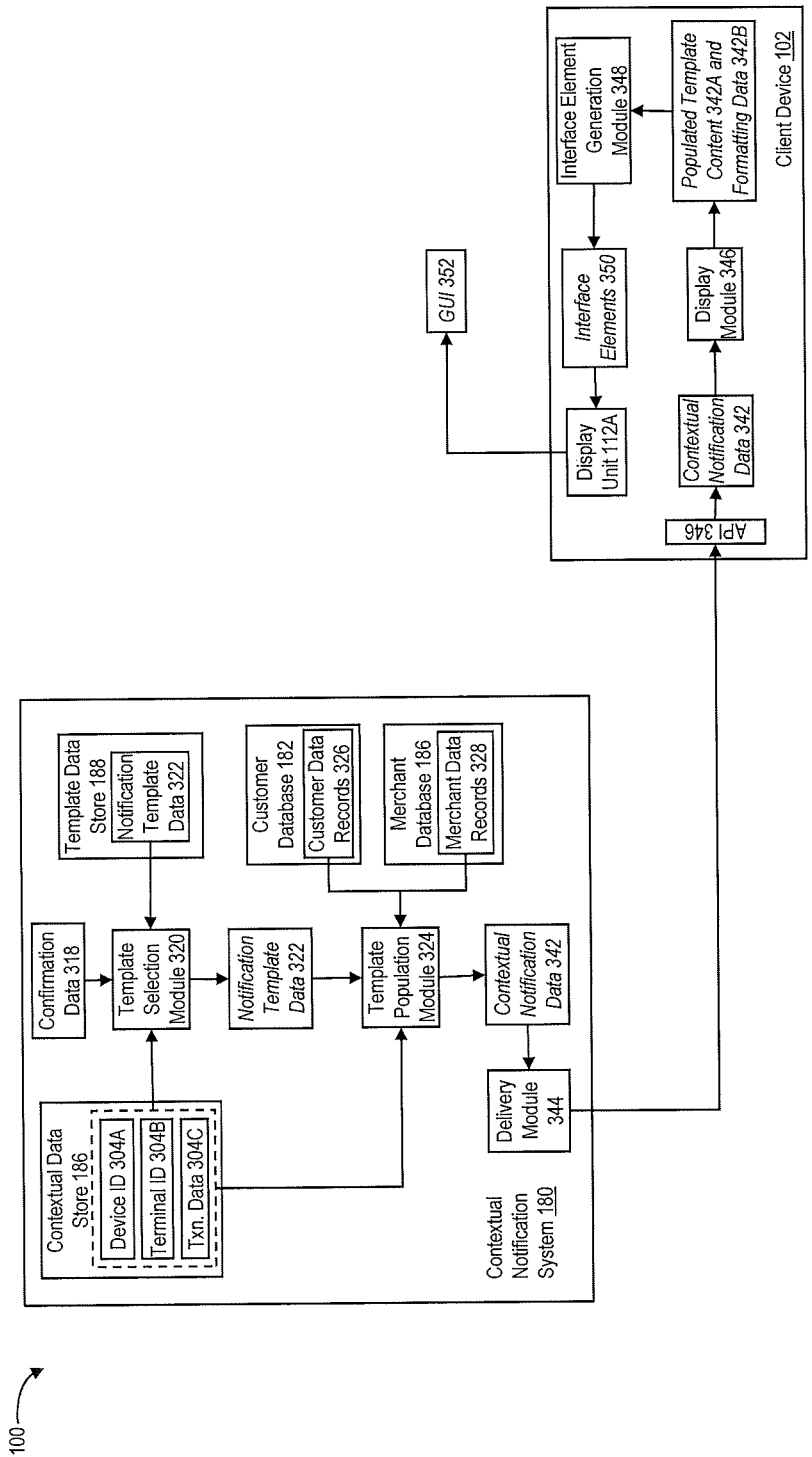
Figure 3C:
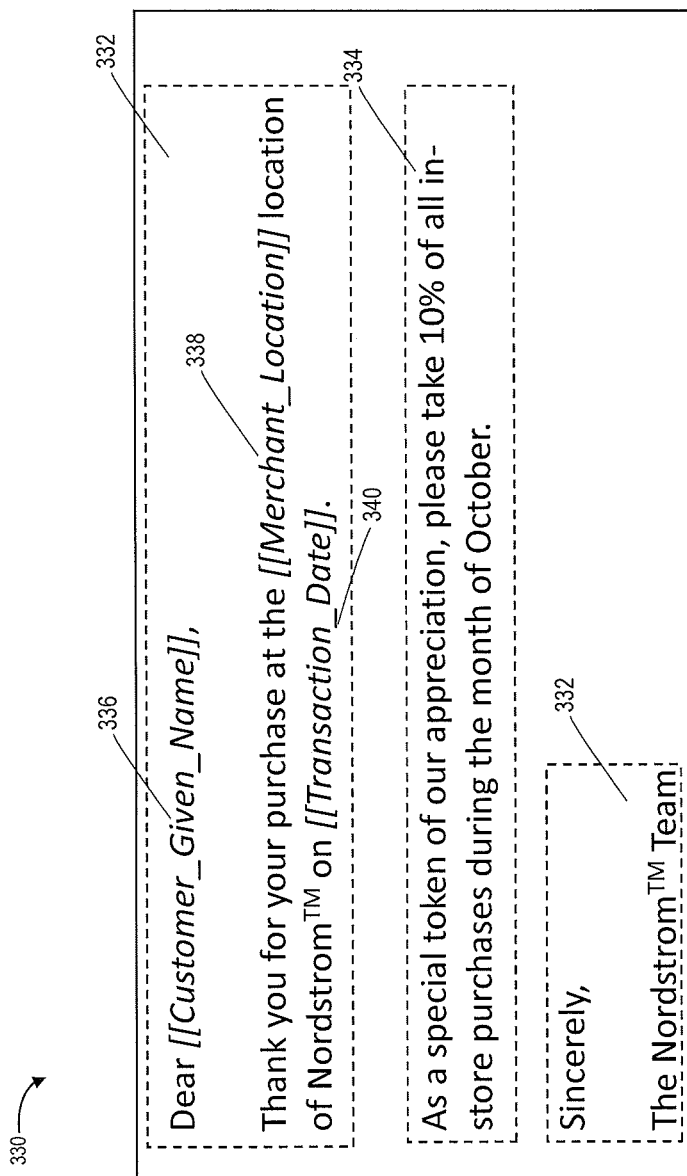
FIGS. 3C and 3D are diagrams illustrating portions of exemplary notification template data, in accordance with disclosed embodiments.
Figure 3D:
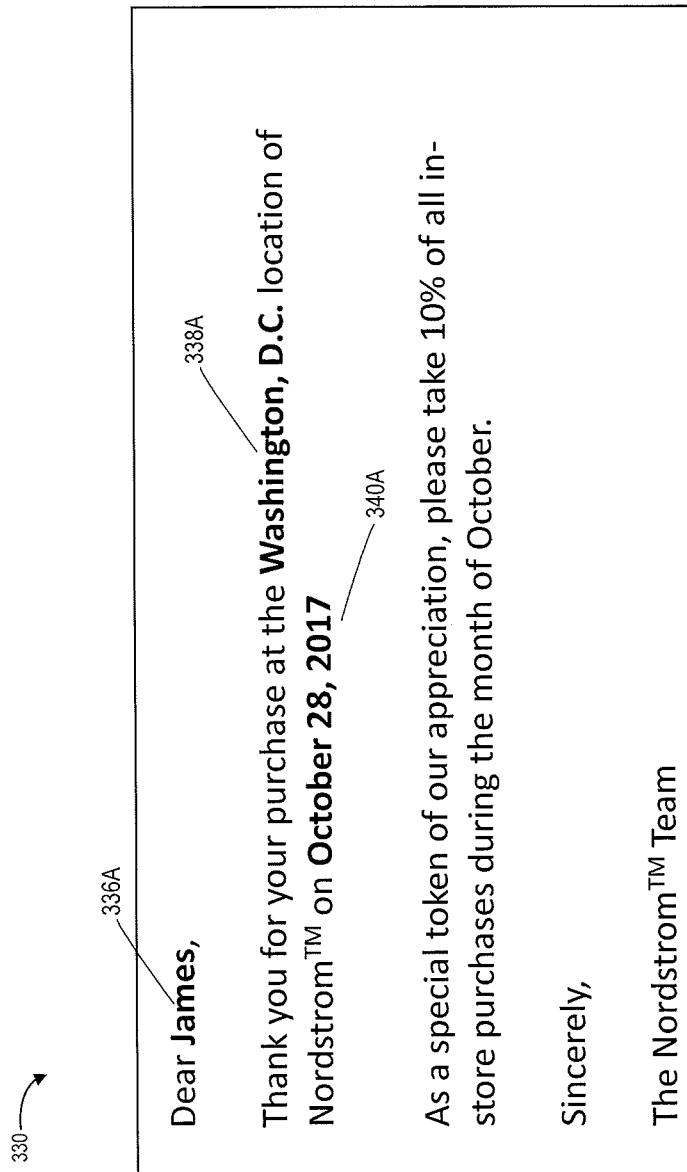

Referring to FIG. 3D, routing module 224 may perform additional operations that communicate with tokenization system 170 through a programmatic interface (e.g., with decryption module 220 of tokenization system 170 through API 228), and may transmit encrypted authorization request 218 directly to tokenization system 170 through API 228, and not to issuer system 160. Tokenization system 170 may perform any of the exemplary processes described herein to decrypt, and in some instances, detokenize, one or more portions of encrypted authorization request 218 and generate a decrypted and detokenized authorization request, e.g., decrypted authorization request 260. Tokenization system 170 may, in some instances, transmit decrypted authorization request 260 across network 120 to issuer system 160, which may perform any of the exemplary processes described herein to authorize an initiated transaction based on portions of decrypted authorization request 260.

In some aspects, tokenization system 170 may not be configured to exchange data with issuer system 160 across one or more direct communications channels or across network 120. Instead, tokenization system 170 may be configured to transmit decrypted authorization request 260 back to payment network system 140 across the established direct communications channel. Routing module 224 of payment network system 140 may receive decrypted authorization request 260 from tokenization system 170, and may be configured to access and load, from issuer data 146, a unique network identifier of issuer system 16 (e.g., an IP address or a MAC address). Further, although not depicted in FIG. 2D, routing module 224 may perform additional operations that establish a direct communications channel with issuer system 160 through a corresponding programmatic interface, and may transmit decrypted authorization request 260 directly to tokenization system 160 through the programmatic interface.

As described herein, issuer system 160 may perform operations that authorize a transaction initiated by a client device, e.g., client device 102 operated by user 101, at a terminal device, e.g., POS terminal 122 operated by merchant 121. For example, the transaction may correspond to a purchase of an article of clothing (e.g., a sweater) from a physical location of merchant 121 (e.g., a Nordstrom™ store located in Washington, D.C.). In further embodiments, issuer system 160 may also generate and transmit contextual data characterizing the authorized transaction to an additional system operating within environment 100, such as a contextual notification system 180. The contextual data may, for example, include values of one or more transaction parameters that characterize the authorized transaction, an identifier of client device 102 or user 101, and an identifier of POS terminal 122 or merchant 121, which may collectively establish a "context" of the authorized transaction.

As described below in reference to FIGS. 3A and 3B, contextual notification system 180 may process the received contextual data, identify or generate a notification template consistent with the authorized transaction, merchant 121, and/or user 101. Contextual notification system 180 may populate the notification template with portions of the contextual data, augmented with additional data characterizing user 101 or merchant 121, to generate notification data of contextual and temporal relevance to the authorized transaction. In some instances, contextual notification system 180 may provide the generated notification data to client device 102 contemporaneously with the authorization of the initiated transaction by issuer system 160 for presentation through a corresponding interface, such as a GUI generated by the executed payment application.

Referring to FIG. 3A, a contextual notification module 302 of issuer system 160 may receive, as an input, authorization data 246 that confirms the authorization of the initiated purchase transaction in accordance with certain transaction parameter values (e.g., as specified within transaction data 209) and using the selected payment instrument (e.g., as specified within payment instrument data 204). In some aspects, and responsive to the receipt of authorization data 246, contextual notification module 302 may generate contextual data 304 that characterizes the authorized transaction, and a routing module 306 of issuer system 160 may perform operations that transmit contextual data 304 across network 120 to a network address of contextual notification system 180. A programmatic interface established and maintained by contextual notification engine 180, such as API 308, may receive and route contextual data to a management module 310. In some instances, management module 310 may perform operations that store all or a portion of contextual data 304 within one or more tangible, non-transitory memories, e.g., within contextual data store 186, and API 308 may facilitate module-to-module communications between routing module 308 of issuer system 160 and management module 310 of contextual notification system 180.

As illustrated in FIG. 3A, contextual data 304 may include, but is not limited to, an identifier of client device 102 (e.g., device identifier 304A), and identifier of POS terminal 122 (e.g., terminal identifier 304B), and values of transaction parameters that characterize the authorized purchase (e.g., transaction data 304C, which includes, but is not limited to, the transaction amount, the identifier of the purchased product, and/or the transaction date or time). Device identifier 304A and/or terminal identifier 304B may include, but are not limited to, an IP address, a MAC address, or other unique network identifier. Further, in certain aspects, a registration confirmation module 312 of contextual notification system 180 may access portions of stored contextual data 304, and perform operations that determine whether user 101 and/or merchant 121 registered (e.g., "opted-in") to participate in the contextual notification processes described herein.

For example, registration confirmation module 312 may perform operations that access and load device identifier 304A from stored contextual data 304, and further, that access one or more stored data records that identify and characterize customers that registered to participate in the contextual notification processes described herein, e.g., within registered customer records 314 of customer database 182. In one instance, registration confirmation module 312 may confirm that device identifier 304A, which identifies client device 102 operated by user 101, is associated with at least one of registered customer records 314 and thus, that user 101 is a registered customer that opted-in to receive contextual notifications of relevance to purchase transactions authorized by issuer system 160.

In further examples, registration confirmation module 312 may perform additional operations that access and load terminal identifier 304B from stored contextual data 304, and further, that access one or more stored data records that identify and characterize merchants that registered to participate in the contextual notification processes described herein, e.g., within registered merchant records 316 of merchant database 184. In one instance, registration confirmation module 312 may determine that terminal identifier 304B, which identifies terminal device 122 operated by merchant 121, is associated with at least one of registered merchant records 316. Based on this determination, registration confirmation module 312 may establish that merchant 121 agrees to participate in participate in the contextual notification processes described herein and further, provide data specifying one or more notification templates that support the generation of these contextual notifications.

In response to the determination that user 101 and/or merchant 121 opted-in to participate in the contextual notification processes described herein, registration confirmation module 312 may generate confirmation data 318 that confirms the participant status of user 101 and/or merchant 121, and includes, among other things, device identifier 304A and terminal identifier 304B. In some aspects, registration confirmation module may provide confirmation data 318 as an input to a template selection module 320.

Referring to FIG. 3B, template selection module 320 may receive confirmation data 318, and may access portions of stored contextual data 304, e.g., as maintained within contextual data store 186. In some aspects, template selection module 320 may access template data store 188. For example, as described herein, template data store 188 may include template data identifying and characterizing one or more notification templates that, when processed by contextual notification system 180, facilitate a generation of notification data having contextual and temporal relevance to the authorized purchase transaction, e.g., the purchase of the $50.00 sweater from the Washington, D.C., location of Nordstrom™, on Oct. 28, 2017.

In some instances, one or more of the notification templates may be specific to a particular merchant, and the stored template data characterizing each of the merchant-specific templates may include an identifier of the corresponding merchant, such as a merchant name. In additional instances, and consistent with the disclosed embodiments, one or more of the notification templates may be specific not only to a particular merchant, but also to purchase transactions initiated during a particular temporal interval (e.g., a particular season). The stored template data characterizing each of the seasonal and merchant-specific templates may include an identifier of the corresponding merchant, such as a merchant name, and an identify of the corresponding temporal interval.

The disclosed embodiments are, however, not limited to these examples of seasonal or merchant-specific templates. In other aspects, described herein, one or more of the notification templates may be associated with additional or alternate data characterizing the authorized purchase transaction, user 101, or merchant 121. For example, one or more of the notification templates may be specific to a particular merchant, and may further include digital content of relevance to, customers exhibiting certain demographic characteristic (e.g., an age bracket, an income or educational level, a city or state of residence, etc.), a specified location of the particular merchant, or a particular product or service involved in the authorized transaction.

Based on portions of the confirmation data 318 and/or stored contextual data 304, template selection module 320 may identify and extract notification template data 322 specifying a notification template that is consistent with, and appropriate to, the now authorized purchase transaction. For example, confirmation data 318 may include data specifying that the authorized purchase transaction was initiated at the Washington, D.C., location of Nordstrom™, and transaction data 304C may specify that client device 102 initiated the authorized purchase transaction at 14:35 on Oct. 28, 2017. In some aspects, template selection module 320 may process the stored template data (e.g., as maintained within template data store 188) to identify a corresponding one of the notification templates that is associated with purchase transactions initiated at Nordstrom™. Template selection module 320 may extract a portion of the stored template data, e.g., notification template data 322, that specifies the identified notification template, and provide notification template data 322 as an input to template population module 324.

In other instances, and based on the stored notification template data, template selection module 320 may identify a plurality of the messaging templates that are associated with purchase transactions initiated at Nordstrom™. Template selection module 320 may, in some aspects, filter the identified plurality of notification templates in accordance with a value of one or more transaction parameters that characterize the now-initiated purchase transaction, such as, but not limited to, a transaction date or time, a transaction location, or an identifier of the purchased product or service, and select a corresponding one of the plurality of notification templates that is consistent with, and appropriate to, the one or more transaction parameter values.

For example, the authorized transaction may have been initiated by client device 102 at 14:35 on Oct. 28, 2017, and based on the stored template data, template selection module 320 may identify the notification template that is specific to not only purchases initiated at Nordstrom™ locations, but also to purchase transactions initiated during the month of October. As described above, template selection module 320 may extract a portion of the stored template data, e.g., notification template data 322, that specifies the identified notification template, and provide notification template data 322 as an input to template population module 324.

Template population module 324 may perform operations that process notification template data 322 and populate portions of notification template data 322 with additional elements of data characterizing the authorized purchase transaction, the customer (e.g., user 101), and/or the merchant (e.g., the Nordstrom™ retail location) to generate contextual notification data 326 suitable for transmission to client device 102. In some instances, notification template data 322 may establish a framework for a contextual notification relevant to user 101's authorized purchase of the sweater from the Nordstrom™ retail location. For example, notification template data 322 may specify one or more elements of digital (e.g., textual content, graphical content, audio or visual content, etc.) for inclusion within the generated notification data, and may include formatting data that establishes visual characteristics (e.g., a font size of the textual content) and/or positions of the one or more elements of graphical content when rendered for display on a corresponding interface.

Further, notification template data 322 may include, at corresponding positions within the graphical content, placeholder data (e.g., metadata pointers or tags) that references corresponding elements stored transaction, customer, and/or merchant data. In some aspects, described below in reference to FIGS. 3C and 3D, template population module 324 can perform operations that parse the notification template data, detect the occurrences of each placeholder data element within the template content, and based on the placeholder data elements, access and load the corresponding elements stored transaction, customer, and/or merchant data from the one or more tangible, non-transitory memories (e.g., from one or more of customer database 182, merchant database 184, or contextual data store 186). Template population module 324 may perform further operations that populate the identified notification template by replacing each of the placeholder data elements within notification template data 322 with the corresponding elements of the stored transaction, customer, and/or merchant data.

FIG. 3C is a schematic diagram illustrating an exemplary notification template 330 consistent with, and appropriate to, user 101's authorized purchase of the sweater from the Nordstrom™ retail location in Washington, D.C., on Oct. 28, 2017. As illustrated in FIG. 3C, template data specifying notification template 330 may include template content 332 specific only to the merchant involved in the authorized transactions (e.g., Nordstrom™), and additional template content 334 specific to both the merchant involved in the authorized transaction (e.g., Nordstrom™) and a temporal interval during which user 101 initiated the authorized transaction (e.g., October $1^{st}$-October $31^{st}$). For example, additional template content 334 include, but is not limited to, promotional material that incentives user 101 to initiate additional purchases at the merchant during the temporal interval.

As further illustrated in FIG. 3C, template content 332 may also include placeholder data (e.g., metadata pointers or tags) identifying discrete and corresponding elements of stored data characterizing the authorized purchase transaction, the customer, and/or the merchant. For example, template content 322 may include placeholder data 336, which identifies a given name of the customer involved in the authorized purchase transaction, placeholder data 338, which identifies a location of the merchant involved in the authorized purchase transaction, and placeholder data 340, which identifies a transaction date associated with the authorized purchase transaction. In some aspects, described herein, template population module 324 may perform operations that populate notification template 330 by replacing each of additional information elements 336, 338, and 340 with the corresponding identified elements of the stored transaction, customer, and/or merchant data.

Referring back to FIG. 3B, to populate placeholder data 336 with the given name of user 101 (e.g., the customer involved in the authorized transaction), template population module 324 may access customer database 182 and identify one or more customer data records 326 associated with device identifier 304A. Template population module 324 may parse extracted data records 326 to obtain customer data 336A identifying a given name of user 101 (e.g., "James"), and modify an additional portion of notification template data 322 to replace placeholder data 336 with customer data 336A.

In further instances, and to populate placeholder data 338 with the location of merchant 121 (e.g., the merchant location involved in the authorized transaction), template population module 324 may access merchant database 184, and identify one or more merchant data records 328 associated with terminal identifier 304B. Template population module 324 may parse extracted data records 328 to obtain merchant data 338A identifying the location of merchant 121 (e.g., "Washington, D.C."), and modify a portion of notification template data 322 to replace placeholder data 338 with merchant data 338A.

In further instances, and to populate placeholder data 340 with the transaction data associated with the authorized transaction, template population module 324 may access transaction data 304C within stored contextual data 304, and extract, from transaction data 304C, temporal data 340A specifying the transaction date of the authorized transaction (e.g., "Oct. 28, 2017"). Template population module 324 may modify another portion of notification template data 322 to replace placeholder data 340 with temporal data 340A.

FIG. 3D is a schematic diagram a schematic diagram illustrating exemplary notification template 330 populated with corresponding ones of customer data 336A (e.g., the given name of "James" associated with user 101), merchant data 338A (e.g., the "Washington, D.C.," location of merchant 121), and temporal data 340A (e.g., the transaction date of "Oct. 28, 2017"). Further, although not depicted in FIGS. 3C and 3D, template population module 324 may perform any of the exemplary processes described herein to populate any additional or alternate placeholder data within notification template 330 with corresponding elements of stored customer, merchant, and/or transaction data (e.g., from one or more of customer database 182, merchant database 184, or contextual data store 186).

Referring back to FIG. 3B, template population module 324 may generate contextual notification data 342 that includes the populated notification template and additionally or alternatively, one or more portions of the formatting data that establishes visual characteristics and/or positions of specific elements of populated template content when rendered for display on the corresponding interface. Template population module 324 may provide contextual notification data 342 and an input to a delivery module 344, which may identify a network address that identifies client device 102 (e.g., an IP address or a MAC address specified within device identifier 304A), and transmit contextual notification data 342 across network 120 to the identified network address, e.g., using any of the communications protocols outlined above.

In certain aspects, a programmatic interface established and maintained by client device 102, such as application programming interface (API) 346, may receive contextual notification data 342 from contextual notification system 180. By way of example, API 346 may be associated with, and established and maintained by a display module 346 of client device 102, and may facilitate direct, module-to-module communications between delivery module 344 of contextual notification system 180 and display module 346. API 346 may provide contextual notification data 342 as an input to display module 346 executed by client device 102.

By way of example, display module 346 may be associated with one or more application programs executed by client device 102, such as the payment application described herein, and display module 346 may be configured to perform operations that extract, from contextual notification data 342, populated template content 342A and formatting data 342B. In some instances, display module 346 may provide populated template content 342A and formatting data 342B as inputs to an interface element generation module 348, which may process populated template content 342A to generate one or more interface elements 350 that reflect populated template content 342A and further, that are formatted in accordance with formatting data 342B. In some aspects, interface element generation module 252 may provide interface elements 350 to display unit 127A, which may present interface elements 350 to user 101 within a graphical user interface (GUI) 352.

In some aspects, and using any of the exemplary processes described herein, an application program executed by client device 102, such as a payment application, may cause client device 102 to exchange data with a POS terminal over a direct communications channel. As described herein, the exchange of data may initiate and facilitate a purchase transaction, and issuer system 160 may perform any of the exemplary processes described herein to authorize the purchase transaction and provide data establishing a context of the authorized purchase transaction to an additional system operating within environment 100, such as contextual notification system 180.

Based on the contextual data, contextual notification system 180 may perform any of the exemplary processes described herein to access and load a notification template consistent with the established transaction context, and to populate the loaded notification template with specific elements of data characterizing a customer involved in the authorized transaction or a merchant involved in the authorized transaction, along with additional elements of the contextual data. In some aspects, contextual notification system 180 may provide data characterizing the populated notification template to client device 102 through a programmatic interface maintained by the executed application program, e.g., the payment application, and client device 102 may render the data characterizing the populated notification template for presentation within a GUI native to, and generated by, the executed application program.

Certain of the exemplary, computer-implemented processes described herein automatically generate template-based notifications of contextual and temporal relevance to an authorized purchase transaction, and provide these generated template-based notifications to a network-connected device that initiated the purchase transaction contemporaneously with the authorization of the purchase transaction, e.g., through application-to-application communication channels established via programmatic interfaces. In some aspects, by facilitating post-transaction messaging through application-to-application communications channels, certain of the disclosed embodiments may reduce the computational load on computer systems maintained by payment networks and issuers of payment instruments and further, reduce a potential exploitation of the contextual notifications by malicious third parties operating within the computing environment.

Further, certain of the exemplary, computer-implemented processes generate notification data by populating one or more accessible notification templates with corresponding elements of customer data, merchant data, or contextual data characterizing an authorized transaction. As described above, the notification templates may include digital content (e.g., textual content, graphical content, etc.) specific to particular merchants or to certain parameter values that characterize the authorized purchase transaction (e.g., digital content having seasonal relevance) and in some instances, computing systems maintained by the particular merchants may provide template data specifying these notification templates to contextual notification system 180, or curate template data specifying additional or alternate notification templates, at regular or predetermined intervals, or in response occurrences of various events. In other aspects, described below in reference to FIG. 4, certain exemplary computer-implemented processes generate notification data based not on predefined notification templates, but based on dynamically generated notification templates generated that reflect, and are customized to, one or more demographic characteristics of a customer or a merchant involved in an authorized purchase transaction and additionally or alternatively, one or more parameter values that characterize the initiated purchase transaction.

Figure 4:
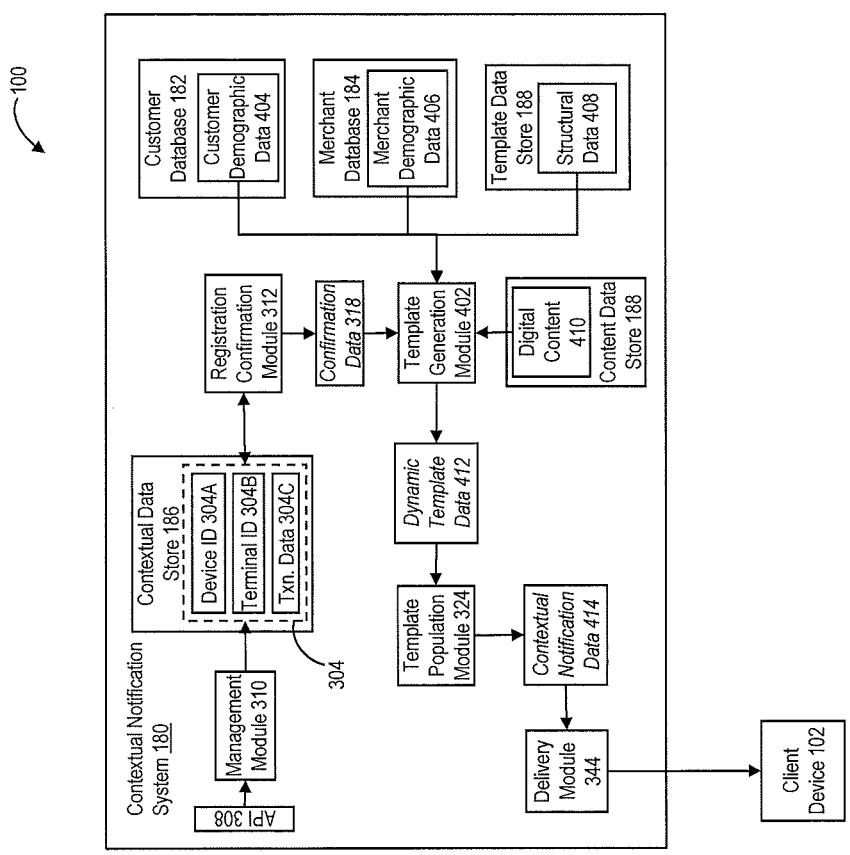
FIGS. 4 and 5 are diagrams illustrating portions of an exemplary computing environment, consistent with the disclosed embodiments.

Referring to FIG. 4, contextual notification system 180 may receive, through API 308, contextual data 304 that characterizes a transaction authorized by issuer system 160, and API 308 may receive and route contextual data 304 to management module 310, which may perform operations that store all or a portion of contextual data 304 within one or more tangible, non-transitory memories, e.g., within contextual data store 186. As illustrated in FIG. 4, contextual data 304 may include, but is not limited to, an identifier of client device 102 (e.g., device identifier 304A), and identifier of POS terminal 122 (e.g., terminal identifier 304B), and values of transaction parameters that characterize the authorized purchase (e.g., transaction data 304C, which includes, but is not limited to, the transaction amount, the identifier of the purchased product, and/or the transaction date or time). In certain aspects, a registration confirmation module 312 of contextual notification system 180 may access portions of stored contextual data 304, and perform any of the exemplary processes described herein to determine that user 101 and/or merchant 121 registered (e.g., "opted-in") to participate in certain exemplary contextual notification processes.

In response to the determination that user 101 and/or merchant 121 opted-in to participate in the contextual notification processes described herein, registration confirmation module 312 may generate confirmation data 318 that includes information confirming the participant status of user 101 and/or merchant 121, along with device identifier 304A and terminal identifier 304B. In some aspects, registration confirmation module 312 may provide confirmation data 318 as an input to a template generation module 402, which may generate a notification template consistent with, and appropriate, to one or more demographic characteristics of, user 101 or merchant 121, one or more demographic characteristics of merchant 121, and additionally or alternatively, one or more parameter values that characterize the authorized transaction.

For example, template generation module 402 may receive confirmation data 318, and may process registration data 318 to extract device identifier 304A. Template generation module 402 may also perform operations that access customer database 182, and load one or more elements of customer demographic data 404 that are associated with, or linked to, the device identifier 304A and/or the identifier of user 101 within customer database 182. In some aspects, customer demographic data 404 may specify values, or ranges of values, that characterize certain demographic characteristics exhibited by user 101. These demographic characteristics may include, but are not limited to, age, gender, educational level, occupation, income, residence, native, spoken, or preferred language, civil or marital status, or number of children, and contextual notification system 180 may receive portions of customer demographic data 404 from client device 102 during any of the exemplary registration processes described herein (e.g., as input provided to client device 102 by user 101).

Further, template generation module 402 may perform similar operations that access merchant database 184, and load one or more elements of merchant demographic data 406 that are associated with, or linked to, terminal identifier 304B and/or the identifier of merchant 121 within merchant database 184. In some aspects, merchant demographic data 406 may specify values, or ranges of values, that characterize certain demographic characteristics exhibited by merchant 121, such as, but not limited to, a merchant type, a class of products sold by the merchant, a merchant location, or operational characteristics of the merchant, such as operating hours.

Template generation module 402 may perform additional operations that access template data store 188, and extract structural data 408 identifying and characterizing a structure of one or more notification templates generated dynamically through the exemplary processes described herein. For example, structural data 408 may specify that the dynamically generated templates include, among other things, a textual greeting appropriate to a corresponding customer, textual content that identifies and thanks the corresponding customer for an authorized transaction, additional elements of digital content consistent with, and appropriate to, the demographic characteristics of the customer.

Further, in some aspects, template generation module 402 may also perform operations that access content data store 190, and extract one or more elements 410 of digital content that are appropriate to and associated with customer demographic data 404 and/or merchant demographic data 406, appropriate to portions of transaction data 304C, and further, are consistent with the template structure specified within structural data 408. For example, and as described above, content data store 190 may include a plurality of elements of digital content suitable for incorporation into the dynamically generated notification templates described herein, and may maintain, for each of the digital content elements, additional data (e.g., metadata) associating that digital content elements with one or more customer demographic characteristics.

By way of example, a digital content element referencing Victoria Day may be associated with metadata specifying that digital content element to customers residing in Canada, while a similar digital content element that references Memorial Day may be associated with metadata specifying that digital content element to customers residing in the United States. In additional examples, certain digital content elements may include audible or textual content in French, and may be associated with metadata that specifying these digital content elements to customers residing in Francophone regions or that identify French as a native or preferred language. In further examples, digital content elements referencing certain luxury products, such as luxury automobiles or watches, may be associated with metadata that identifies a certain income, educational, and/or age characteristic. Further, in some instances, one or more of the digital content elements may be tailored to specific age groups or educational levels (e.g., informal textual greeting that include a customer's given name or more formal greetings that include certain titles of respect, such as "Mr.," "Ms.," "Dr.," etc.). These disclosed embodiments are, however, not limited to these examples of digital content elements and associated demographic characteristics, and in other aspects, content data store 190 may include elements of digital content associated with any additional or alternate customer demographic characteristics, merchant demographic characteristics, and/or parameter values that characterize the authorized transaction, such as a transaction date.

Template generation module 402 may perform operations that, in accordance with structural data 408, combine extracted digital content elements 410 to generate dynamically a notification template that is customized to reflect the demographic characteristics of user 101 and/or merchant 121, and output dynamic template data 412 that characterizes the dynamically generated notification template. In additional aspects, and consistent with the disclosed embodiments, the dynamically generated notification template may also be customized to reflect one or more of the transaction parameters that characterize the authorized transaction, such as a transaction data (e.g., as specified within transaction data 304C). Further, and as described above, dynamic template data 412 that characterizes the dynamically generated notification template may specify or identify the extracted elements of digital content (e.g., digital content elements 410, as described above), along with formatting data that establishes visual characteristics (e.g., a font size of the textual content) and/or positions of the one or more elements of digital content when rendered for display on a corresponding interface.

In some aspects, template generation module 402 may provide dynamic template data 412 as an input to template population module 324, which may perform any of the exemplary processes described herein to populate the dynamically generated notification template with additional data characterizing the authorized transaction, user 101, and/or merchant 121. For example, and as described above, dynamic template data 412 may include, at corresponding positions within the digital content, placeholder data (e.g., metadata pointers or tags) that references corresponding elements stored data characterizing the authorized transaction, user 101, and/or merchant 121 (e.g., within transaction data 304C, customer database 182, or merchant database 184). Using any of the exemplary processes described herein, template population module 324 can perform operations that parse dynamic template data 412, detect the occurrences of each placeholder data element, and based on the placeholder data elements, access and load the corresponding elements stored transaction, customer, and/or merchant data from the one or more tangible, non-transitory memories. Template population module 324 may perform further operations that populate the dynamically generate notification template by replacing each of the placeholder data elements within dynamic template data 412 with the corresponding elements of the stored transaction, customer, and/or merchant data.

In some aspects, template population module 324 may generate contextual notification data 414 that includes the populated notification template and additionally or alternatively, one or more portions of the formatting data that establishes visual characteristics and/or positions of specific elements of populated template content when rendered for display on the corresponding interface. Template population module 324 may provide contextual notification data 414 and an input to a delivery module 344, which may identify a network address that identifies client device 102 (e.g., an IP address or a MAC address specified within device identifier 304A), and transmit contextual notification data 414 across network 120 to the identified network address, e.g., using any of the communications protocols outlined above. Client device 102 may perform any of the exemplary processes described above to render and present portions of contextual notification data 414 on a corresponding interface, such as a GUI generated by the executed payment application.

In certain of the exemplary embodiments, contextual notification system 180 may be configured to receive contextual data from issuer system 160 that characterizes a newly authorized transaction. In response to the received contextual data, contextual notification system 180 may perform any of the exemplary processes described above to access or generate an appropriate notification template, and to populate that access or generated notification template with corresponding portions of transaction, customer, and/or merchant data. As described herein, contextual notification system 180 may establish a communications channel with client device 102 (e.g., via API 346, as established and maintained by the executed payment application), and transmit data characterizing the populated notification template for presentation on a corresponding interface.

While these exemplary processes facilitate provision of notification data that is both contextually and temporally relevant to an authorized transaction, contextual notification system 180 may be configured to initiate the access or generation of the notification template only after a successful authorization of the initiated transaction by issuer system 160 and the receipt of contextual data characterizing the authorized transaction. In additional exemplary embodiments, described below in reference to FIG. 5, contextual notification system 180 may be configured to perform operations that access or generate the appropriate notification template in parallel with the authorization of the initiated transaction by issuer system 160. As outlined below, contextual notification system may store (e.g., "cache") the accessed or generated notification template in a locally accessible memory until receipt from issuer system 160 of the contextual data characterizing the authorized transaction, which causes contextual notification system 180 to retrieve the cached notification template and populate the cached notification template using any of the processes describe herein.

Figure 5:
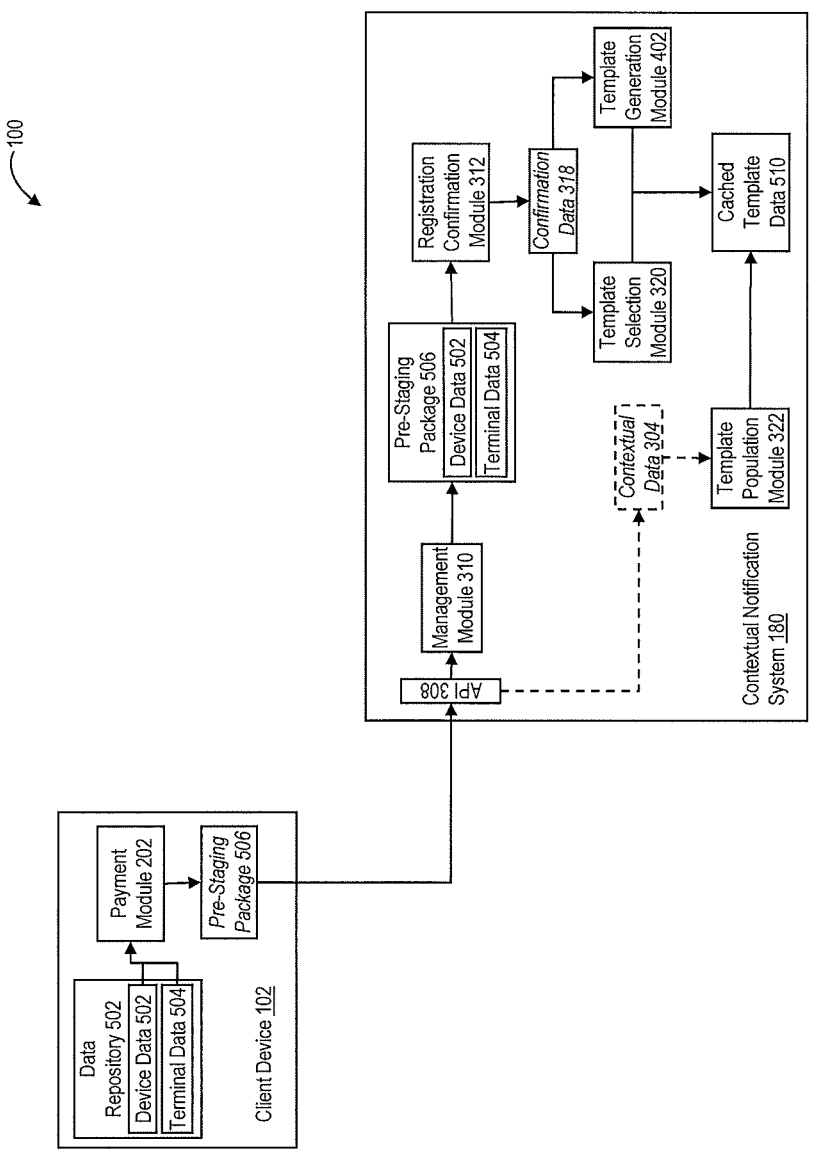

Referring to FIG. 5, payment module 202 may perform any of the exemplary processes described above to generate and transmit payment data (e.g., payment data 208 of FIG. 2A) across communications channel 120A to POS terminal 122 using any of the short-range communications protocols outlined above. Further, through the establishment of communications channel 120A, client device 102 may determine a unique identifier of POS terminal 122, such as an IP address, a MAC address, or another appropriate network identifier, and may store that unique identifier within a corresponding tangible, non-transitory memory (e.g., within a portion of data repository 106).

In some aspects, payment module 202 may perform additional operations that access and load, from corresponding portions of data repository 106, device data 502 that uniquely identifies client device 102 within communications network 120 (e.g., an IP address, a MAC address, etc.) and terminal data 504 that uniquely identifies POS terminal 122 (e.g., the determined IP address, MAC address, or network identifier described above). Payment module 202 may package portions of device data 502 and terminal data 504 into a corresponding pre-staging package 506, and transmit pre-staging package 506 across network 120 to a corresponding network address of contextual notification system 180 (e.g., as maintained within data repository 106).

A programmatic interface established and maintained by contextual notification engine 180, such as API 308, may receive and route pre-staging package 506 to a management module 310, which may store all or a portion of pre-staging package 506 within one or more tangible, non-transitory memories. As described above, API 308 may facilitate module-to-module communications between payment module 202 of client device 102 and management module 310 of contextual notification system 180. Further, management module 310 may perform operations that route pre-staging package 506, which includes the identifiers of client device 102, to registration confirmation module 312, which may perform any of the exemplary processes described above (e.g., in reference to FIGS. 3A and 4) to confirm the participant status of user 101 and/or merchant 121, and generate corresponding confirmation data, such as confirmation data 508, indicative of the confirmation.

In some aspects, template selection module 320 may receive confirmation data 318, and may perform any of the exemplary processes described herein to identify a stored notification template that is specific to, or consistent with, user 101 or merchant 121, and to extract template data (e.g., from template data store 188) characterizing the identified notification template. In other aspects, template generation module 402 may receive registration data 318, and may perform any of the exemplary processes described herein to generate dynamically a notification template specific to, or consistent with, user 101 or merchant 121, and to output template data that characterizes the dynamically generated notification template. In further aspects, illustrated in FIG. 5, template selection module 320 or template generation module 402 of contextual notification system 180 may store the generated template data within one or more tangible, non-transitory memories to establish cached template data 510

In some embodiments, and based on pre-staging package 506, template selection module 320 or template generation module 402 may perform operations that identify or generate the notification template, extract or output the corresponding template data, and store that template data within the one or more tangible, non-transitory memories to establish cached template data 510 in parallel with the authorization of the initiated transaction by issuer system 160, and prior to receipt of contextual data 304 characterizing the authorized transaction. Upon receipt of contextual data 304 from issuer system 160, template population module 324 may access cached template data 510, and may perform any of the exemplary processes described above to populate portions of cached template data 324 with corresponding elements of transaction, customer, or merchant. Further, although not illustrated in FIG. 5, contextual notification system 180 may perform any of the exemplary processes described herein to transmit data characterizing the populated notification template to client device 102, e.g., through API 346, for rendering and presentation through a corresponding interface.

Certain of these exemplary computer-implemented processes, which select or generate an appropriate notification template in parallel with the authorization of an initiated transaction by an issuer system, can be implemented in addition to, or as an alternate to, other exemplary computer-implemented processes that select or generate the appropriate notification template after receipt of contextual data characterizing the authorized transaction. In some aspects, the selection or generation of the notification template in parallel with the transaction authorization can reduce a temporal delay between the transaction authorization and a transmission of a contextual notification to a client device that initiated the transaction, and can further establish a temporal relevance of the contextual notification to the authorized transaction.

Figure 6:
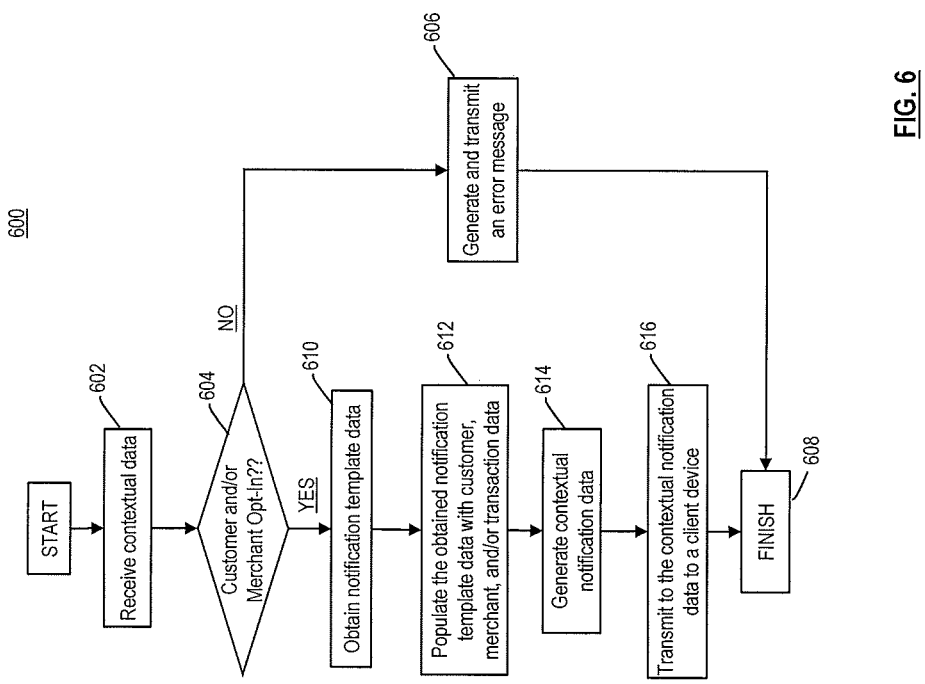
FIG. 6 is a flowchart of exemplary processes for generating notifications of contextual and temporal relevance to authorized exchanges of data, in accordance with the disclosed embodiments.

FIG. 6 is a flowchart of an exemplary process 600 for generating notifications of contextual and temporal relevance to authorized data exchanges, in accordance with the disclosed embodiments. In certain aspects, and as described above, the data exchange may facilitate a secure, real-time authorization of a transaction initiated at a network-connected device, such as POS terminal 122 of FIG. 1. For example, the initiated transaction may correspond to a purchase transaction in which a customer, e.g., user 101 of FIG. 1, purchases a good or service from a merchant, e.g., merchant 121, at an agreed-upon price (e.g., a transaction amount). In certain instances, and as described above, POS terminal 122 may establish a direct channel of communications (e.g., communications channel 120A of FIG. 1) with a client device (e.g., client device 102 of FIG. 1), which may be operated by user 101 and configured to execute an application program, such as the payment application described above.

POS terminal 122 may perform operations that program a selectively encrypted (and/or tokenized) request to authorize the initiated transaction to a computing system that issues a payment instrument involved in the initiated transaction (e.g., issuer system 160). In conjunction with through one or more intermediaries (e.g., through acquirer system 130, payment network system 140, and/or tokenization system 170), issuer system may perform operations that authorize the initiated transaction and relay a confirmation of the authorized transaction to POS terminal 122. In further aspects, issuer system 160 may also generate additional data that establishes a context of the authorized transaction, e.g., contextual data, and transmit that contextual data to a computing system operating in environment 100 and configured to generate notifications of contextual and temporal relevance to the authorized transaction, e.g., contextual notification system 180. In some examples, contextual notification system 180 may perform the steps of exemplary process 600.

Referring to FIG. 6, contextual notification system 180 may receive, from issuer system 160, contextual data that characterizes the authorized transaction (e.g., in step 602). As described herein, the contextual data may include an identifier of client device 102, an identifier of POS terminal 122, and values of transaction parameters that characterize the authorized transaction (a transaction amount, an identifier of a purchased product or service, a transaction date or time, etc.). In some instances, contextual notification system 180 may perform operations that store all or a part of the received contextual data within one or more tangible, non-transitory memories.

In response to the received contextual data, contextual notification system 180 may perform any of the exemplary processes described herein to determine whether user 101 and/or merchant 121 registered (e.g., "opted-in") to participate in the exemplary contextual notification processes (e.g., in step 604). If contextual notification system 180 were to determine that user 101 is not registered to receive contextual notifications, or alternatively, that merchant 121 is not registered to provide contextual notifications (e.g., step 604; NO), contextual notification system 180 may generate a message declining the received contextual data, and transmit the generated message across network 120 using any of the communications protocols described herein (e.g., in step 606). Contextual notification system 180 may also perform operations that discard the received contextual data (e.g., in accordance with one or more risk management protocols). Exemplary process 600 is then complete in step 608.

Alternatively, if contextual notification system 180 were to determine that both user 101 and/or merchant 121 opted-in to participate in contextual notification processes (e.g., step 604; YES), contextual notification system 180 may obtain data characterizing a notification template that is appropriate to, and consistent with, the transaction parameters of the authorized transaction, merchant data characterizing merchant 121, and/or customer data characterizing user 101 (e.g., in step 610). In one aspect, in step 610, contextual notification system 180 may perform any of the exemplary processes described herein to identify and load the notification template data from a corresponding tangible, non-transitory memory (e.g., from template data store 188 of FIG. 1). In another aspect, in step 610, contextual notification system 180 may perform any of the exemplary processes described herein to generate dynamically the notification template based on demographic data characterizing user 101 and/or merchant 121, and to output notification template data that characterizes the dynamically generated notification template.

As described herein, the notification template data may include or specify one or more elements of digital content (e.g., textual content, graphics, audio-visual content, etc.), along with formatting data that establishes visual characteristics (e.g., a font size of the textual content) and/or positions of the one or more digital content elements when rendered for display on a corresponding interface. Further, and as described herein, the notification template data may also include, at corresponding positions within the digital content elements, placeholder data (e.g., metadata pointers or tags)

that references corresponding elements of stored transaction, customer, and/or user data (e.g., as maintained within contextual data store 186, customer database 182, and merchant database 184 of FIG. 1).

Referring back to FIG. 6, contextual notification system 180 may perform any of the exemplary processes described herein to populate portions of the loaded or generated notification template with corresponding elements of transaction, customer, and/or user data (e.g., in step 612). For example, in step 612, to populate the loaded or generated notification template, contextual notification system 180 may perform operations that parse the notification template data, detect the occurrences of each placeholder data element within the notification template data, and based on the placeholder data, access and load the corresponding elements of the stored transaction, customer, and/or merchant data from the one or more tangible, non-transitory memories (e.g., from one or more of customer database 182, merchant database 184, or contextual data store 186). Contextual notification system 180 may perform any of the exemplary processes described herein to populate the loaded or generated notification template by replacing each of the placeholder data elements within the notification template data with the corresponding elements of the stored transaction, customer, and/or merchant data.

Contextual notification system 180 may also generate contextual notification data (e.g., in step 614). As described herein, the contextual notification data may include, but is not limited to, the populated notification template data. The contextual data may also include one or more portions of the formatting data that establishes visual characteristics and/or positions of specific elements of digital content within the populated notification template when rendered for display on the corresponding interface.

In some aspects, contextual notification system 180 may perform any of the exemplary processes described herein to transmit the contextual notification data across network 120 to the identified network address of client device 102, e.g., using any of the communications protocols outlined above. (e.g., in step 616). Exemplary process 600 is then complete in step 608.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including payment module 202, transaction initiation module 210, authorization request module 212, routing modules 220, 222, 224, 234, and 306, request management module 226, decryption module 230, token redemption module 234, authorization decision module 242, confirmation module 248, transaction confirmation module 252, interface element generation modules 254 and 348, contextual notification module 302, management module 310, registration confirmation module 312, template selection module 320, template population module 324, delivery module 344, display module 346, and/or template generation module 402, can be implemented as one or more computer programs, i.e., one or more modules of computer program instructions encoded on a tangible non-transitory program carrier for execution by, or to control the operation of, a data processing apparatus (or a computer system). Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a memory storing instructions; and
at least one processor coupled to the communications unit and the memory, the at least one processor being configured to execute the instructions to:
receive a first signal via the communications unit, the first signal including confirmation data indicative of an authorized data exchange involving a terminal device and a client device, the confirmation data comprising a first identifier of the terminal device, temporal data associated with the authorized data exchange, and a value of a parameter that characterizes the authorized data exchange, the data exchange comprising a purchase transaction initiated at the terminal device by the client device, the first identifier of the terminal device comprising a name of a merchant involved in the purchase transaction, and the temporal data comprising a transaction date or time;
load template data from the memory, the template data comprising a plurality of candidate notification templates, each of the candidate notification templates comprising a merchant identifier and information identifying a temporal interval;
based on at least one of the first identifier of the terminal device or the temporal data, select a corresponding one of the candidate notification templates as a notification template for the authorized data exchange when (i) the merchant name of the corresponding one of the candidate notification templates matches the merchant identifier and (ii) the temporal interval of the corresponding one of the candidate notification templates includes the transaction date or time;

generate notification data associated with the authorized data exchange in accordance with the notification template, the notification data being populated with a portion of the confirmation data; and transmit a second signal via the communications unit to the client device, the second signal including the notification data, the second signal being transmitted through a programmatic interface associated with an application program executed by the client device, and the client device being configured to display the notification data on a corresponding interface.

2. The apparatus of claim 1, wherein the at least one processor is further configured to select the corresponding one of the candidate notification templates based on the parameter value that characterizes the authorized data exchange and at least one of the first identifier of the terminal device or the temporal data.

3. The apparatus of claim 1, wherein:
the confirmation data further comprises a second identifier of the client device; and
the at least one processor is further configured to select the corresponding one of the candidate notification templates based on at least one of the first identifier of the terminal device, the second identifier of the client device, or the temporal data.

4. The apparatus of claim 1, wherein the at least one processor is further configured to:
receive, via the communications unit, a third signal from the client device, the third signal being received prior to the first signal, and the third signal comprising the first identifier and a second identifier of the client device;
load the template data from a first portion of the memory;
select the corresponding one of the candidate notification templates based on at least one of the first identifier of the terminal device, the second identifier of the client device, or the temporal data; and
access an element of the template data associated with the corresponding one of the candidate notification templates and store the accessed.

5. The apparatus of claim 4, wherein the at least one processor is further configured to generate the notification template.

6. The apparatus of claim 1, wherein the at least one processor is further configured to:
identify and load, from the memory, (i) first information associated with the client device and (ii) second information associated with the terminal device;
identify, within the notification template, an element of placeholder content associated with the client device or the terminal device and populate the element of placeholder content with at least a portion of the first information or the second information,
wherein the notification data comprises the populated element of the placeholder content.

7. The apparatus of claim 1, wherein the at least one processor is further configured to:
identify and load, from the memory, (i) first demographic information associated with the first identifier of the terminal device and (ii) second demographic information associated with a second identifier of the client device; and generate the notification template based on at least a portion of the first demographic information or the second demographic information.

8. The apparatus of claim 1, wherein the at least one processor is further configured to:
identify and load, from the memory, data specifying a registration status of the client device;
determine that the client device corresponds to a registered device based on the registration status; and
load the template data from the storage unit when the client device corresponds to the registered device.

9. The apparatus of claim 1, wherein:
the data exchange comprises a transaction initiated at the terminal device by the client device;
the client device executes a payment application associated with a payment instrument available to fund the initiated transaction;
the programmatic interface is associated with the executed payment application; and
the corresponding interface is generated by the executed payment application.

10. A computer-implemented method comprising:
receiving, by at least one processor, a first signal comprising confirmation data indicative of an authorized data exchange involving a terminal device and a client device, the confirmation data comprising a first identifier of the terminal device, temporal data associated with the authorized data exchange, and a value of a parameter that characterizes the authorized data exchange, the data exchange comprising a purchase transaction initiated at the terminal device by the client device, the first identifier of the terminal device comprising a name of a merchant involved in the purchase transaction, and the temporal data comprising a transaction date or time;
loading, by the at least one processor, template data comprising a plurality of candidate notification templates from a memory, each of the candidate notification templates comprising a merchant identifier and information identifying a temporal interval;
based on at least one of the first identifier of the terminal device or the temporal data, selecting, by the at least one processor, a corresponding one of the candidate notification templates as a notification template for the authorized data exchange when (i) the merchant name of the corresponding one of the candidate notification templates matches the merchant identifier and (ii) the temporal interval of the corresponding one of the candidate notification templates includes the transaction date or time;
generating, by the at least one processor, notification data associated with the authorized data exchange in accordance with the notification template, the notification data being populated with a portion of the confirmation data; and
transmitting, by the at least one processor, a second signal to the client device, the second signal including the notification data, the second signal being transmitted through a programmatic interface associated with an application program executed by the client device, and the client device being configured to display the notification data on a corresponding interface.

11. The method of claim 10, wherein the selecting comprises selecting the corresponding one of the candidate notification templates based on the at least one parameter value that characterizes the authorized data exchange, the first identifier of the terminal device, and the temporal data.

12. The method of claim 10, wherein:
the confirmation data further comprises a second identifier of the client device;
the selecting comprises selecting the corresponding one of the candidate notification templates based on at least one of the first identifier of the terminal device, the second identifier of the terminal device, or the temporal data.

13. The method of claim 10, wherein:
the method further comprises receiving, by the at least one processor, a third signal from the client device, the third signal being received prior to the first signal, and the third signal comprising the first identifier and a second identifier of the client device;
the loading comprises loading the template data from a first portion of the memory;
the selecting comprises selecting the corresponding one of the candidate notification templates based on at least one of the first identifier of the terminal device, the second identifier of the client device, or the temporal data; and
the method further comprises:
  by the at least one processor, accessing an element of the template data associated with the corresponding one of the candidate notification templates and storing the accessed element of template data within a second portion of the memory; and
  loading, by the at least one processor, the element of the template data from the second portion of the memory in response to the received confirmation data.

14. The method of claim 10, further comprising:
by the at least one processor, identifying and loading, from the storage unit, (i) first information associated with the client device and (ii) second information associated with the terminal device; and
by the at least one processor, identifying, within the notification template, an element of placeholder content associated with the client device or the terminal device; and
populating, by the at least one processor, the element of placeholder content with at least a portion of the first information or the second information,
wherein the notification data comprises the populated element of the placeholder content.

15. The method of claim 10, further comprising:
by the at least one processor, identifying and loading, from the memory, (i) first demographic information associated with the first identifier of the terminal device and (ii) second demographic information associated with a second identifier of the client device; and
generating, by the at least one processor, the notification template based on at least a portion of the first demographic information or the second demographic information.

16. The method of claim 10, wherein:
the data exchange comprises a transaction initiated at the terminal device by the client device;
the client device executes a payment application associated with a payment instrument available to fund the initiated transaction;
the programmatic interface is associated with the executed payment application; and
the corresponding interface is generated by the executed payment application.

17. A tangible, non-transitory computer-readable medium storing instructions that, when executed by at least one processor, perform a method comprising:

receiving a first signal comprising confirmation data indicative of an authorized data exchange involving a terminal device and a client device, the confirmation data comprising a first identifier of the terminal device, temporal data associated with the authorized data exchange, and a value of a parameter that characterizes the authorized data exchange, the data exchange comprising a purchase transaction initiated at the terminal device by the client device, the first identifier of the terminal device comprising a name of a merchant involved in the purchase transaction, and the temporal data comprising a transaction date or time;
loading template data comprising a plurality of candidate notification templates from a memory, each of the candidate notification templates comprising a merchant identifier and information identifying a temporal interval;
based on at least one of the first identifier of the terminal device or the temporal data, selecting a corresponding one of the candidate notification templates as a notification template for the authorized data exchange when (i) the merchant name of the corresponding one of the candidate notification templates matches the merchant identifier and (ii) the temporal interval of the corresponding one of the candidate notification templates includes the transaction date or time;
generating notification data associated with the authorized data exchange in accordance with the notification template, the notification data being populated with a portion of the confirmation data; and
transmitting a second signal to the client device, the second signal including the notification data, the second signal being transmitted through a programmatic interface associated with an application program executed by the client device, and the client device being configured to display the notification data on a corresponding interface.

18. The apparatus of claim 1, wherein the at least one processor is further configured to:
load an element of digital content from the memory, the element of digital content comprising corresponding metadata;
based on the corresponding metadata and at least one of the first identifier, the temporal data, or the parameter value, determine that the element of digital content is associated with the authorized data exchange; and
when the element of digital content is associated with the authorized data exchange, perform operations that package the element of digital content within a portion of the notification data, the client device being configured to display the element of digital content on the corresponding interface.

19. The apparatus of claim 1, wherein the at least one processor is further configured to:
receiving, via the communications unit, information indicative of the data exchange initiated between the terminal device and the client device, the information being generated by at least one of the client device or the terminal device;
based on the received information, selecting one of the candidate notification templates as an additional notification template for the initiated data exchange;
generate additional notification data associated with the initiated data exchange in accordance with the additional notification template, the additional notification data being populated with a portion of the received information;

receiving, via the communication, additional confirmation data from a computing system, the additional confirmation data being indicative of an authorization of the initiated data exchange by the computing system; and based on additional confirmation data, transmitting, via the communications unit, the additional notification to the client device, the additional notification data being transmitted through the programmatic interface associated with the application program executed by the client device, and the client device being configured to display the additional notification data on the corresponding interface.

* * * * *